United States Patent
Gai et al.

(10) Patent No.: US 6,651,096 B1
(45) Date of Patent: Nov. 18, 2003

(54) METHOD AND APPARATUS FOR ORGANIZING, STORING AND EVALUATING ACCESS CONTROL LISTS

(75) Inventors: Silvano Gai, Vigliano d'Asti (IT); Keith McCloghrie, San Jose, CA (US); Bhushan M. Kanekar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 09/295,187

(22) Filed: Apr. 20, 1999

(51) Int. Cl.$^7$ ............................................... G06F 15/173
(52) U.S. Cl. ...................... 709/223; 709/225; 709/246
(58) Field of Search ................................. 709/223, 225, 709/226, 238, 242, 246

(56) References Cited

U.S. PATENT DOCUMENTS

| | | | | |
|---|---|---|---|---|
| 5,263,157 A | | 11/1993 | Janis ........................... | 395/600 |
| 5,315,657 A | | 5/1994 | Abadi et al. .................... | 380/25 |
| 5,574,910 A | * | 11/1996 | Bialkowski et al. ............ | 707/1 |
| 5,699,513 A | * | 12/1997 | Feigen et al. ................. | 713/201 |
| 5,712,792 A | | 1/1998 | Yamashita et al. ........... | 364/489 |
| 5,748,486 A | * | 5/1998 | Ashar et al. ................... | 716/18 |
| 5,761,669 A | * | 6/1998 | Montague et al. ........... | 707/103 |
| 5,768,519 A | * | 6/1998 | Swift et al. ................... | 709/223 |
| 5,805,462 A | | 9/1998 | Poirot et al. ................. | 364/490 |
| 5,941,947 A | * | 8/1999 | Brown et al. ................. | 709/225 |
| 6,219,706 B1 | * | 4/2001 | Fan et al. ..................... | 709/225 |
| 6,247,108 B1 | * | 6/2001 | Long ............................ | 711/216 |
| 6,256,739 B1 | * | 7/2001 | Skopp et al. ................. | 709/229 |
| 6,279,112 B1 | * | 8/2001 | O'Toole, Jr. et al. ........ | 713/201 |
| 6,381,602 B1 | * | 4/2002 | Shoroff et al. ................ | 707/9 |
| 6,405,202 B1 | * | 6/2002 | Britton et al. ................. | 707/9 |

OTHER PUBLICATIONS

Rudell, "Dynamic Variable Ordering for Ordered Binary Decision Diagrams," IEEE, 1993.*

Hachtel, G. and Somenzi, F., *Logic Synthesis and Verification Algorithms*, Kluwer Academic Publishers, Copyright 1996, pp. vii–xiv and 219–250.

Bahar, R. I., et al., *Algebraic Decision Diagrams and their Applications*, International Conference on Computer Aided Design, Nov. 1993.

(List continued on next page.)

*Primary Examiner*—Ayaz Sheikh
*Assistant Examiner*—Philip B. Tran
(74) *Attorney, Agent, or Firm*—Cesari and McKenna, LLP; Michael R. Reinemann

(57) ABSTRACT

The invention relates to a method and apparatus for efficiently organizing, storing and evaluating access control lists (ACLs) for use by an intermediate network device of a computer network. The intermediate network device includes an ACL converter which, in turn, includes a boolean transformation engine that is operatively coupled to a boolean manipulation engine. The boolean transformation engine is configured to access the ACLs in first format and to translate them into a first boolean representation, such as binary decision diagram (BDD) format. The boolean manipulation engine is configured to perform one or more operations on the ACLs specified for a given interface, including a merge operation, so as to generate a single, unified ACL for the given interface. In order to resolve possibly conflicting actions output by the multiple ACLs, the ACL converter may utilize one or more predefined conflict resolution tables during the merging process. The boolean transformation engine then translates the single, unified ACL into a second boolean representation, such as a sum of products (SOP) format, and stores the single, unified ACL in a preferred memory structure for subsequent evaluation by the intermediate device.

19 Claims, 15 Drawing Sheets

OTHER PUBLICATIONS

Bryant, R. E., *An Analysis of U.S. Patent # 5,243,538 "Comparison and Verification System for Logic Circuits and Method Thereof,"*, Aug. 30, 1994.
Rudell, R., *Dynamic Variable Ordering for Ordered Binary Decision Diagrams*, IEEE, Copyright 1993.
*Espresso—Boolean Minimization*, Mar. 23, 1999.
*Access Control Lists: Overview and Guidelines*, Cisco Systems, Inc., Sep. 9, 1998.
*Network Node Registry—Access Control Lists*, Government of British Columbia, Dec. 30, 1998.
*Increasing Security on IP Networks*, Cisco Systems, Inc., Dec. 30, 1998.

* cited by examiner

416a

| ACL 101 | | | | | |
|---|---|---|---|---|---|
| SOURCE ADDRESS | DESTINATION ADDRESS | SOURCE PORT | DESTINATION PORT | PROTOCOL | ACTION |
| 1.2.3.3 | x.x.x.x | x | x | x | PERMIT |
| 1.2.3.5 | x.x.x.x | 80 | x | x | PERMIT |
| 1.2.3.x | x.x.x.x | x | x | x | DENY |
| 2.5.4.x | x.x.x.x | 100 | x | x | PERMIT AND LOG |
| 2.5.3.x | x.x.x.x | x | x | x | DENY AND LOG |
| x.x.x.x | 3.5.4.x | x | x | TCP | DENY |
| x.x.x.x | x.x.x.x | x | x | x | DENY |

| ACL 202 | | | | | |
|---|---|---|---|---|---|
| SOURCE ADDRESS | DESTINATION ADDRESS | SOURCE PORT | DESTINATION PORT | PROTOCOL | ACTION |
| 10.1.x.x | x.x.x.x | x | x | x | DENY |
| 130.192.7.1 | x.x.x.x | x | x | x | DENY AND LOG |
| 192.1.7.8 | x.x.x.x | x | x | x | DENY AND LOG |
| x.x.x.x | x.x.x.x | x | x | x | PERMIT |

| | SOURCE ADDRESS (516) | DESTINATION ADDRESS (518) | SOURCE PORT (520) | DESTINATION PORT (522) | PROTOCOL (524) | ACTION (526) |
|---|---|---|---|---|---|---|
| | ACL 303 | | | | | |
| 538 | 1.2.3.5 | x.x.x.x | x | 23 | TCP | PERMIT |
| 540 | 1.2.3.6 | x.x.x.x | x | 23 | TCP | PERMIT |
| 542 | 1.2.3.7 | x.x.x.x | x | 23 | TCP | PERMIT |
| 544 | x.x.x.x | x.x.x.x | x | x | x | DENY |

| | SOURCE ADDRESS (516) | DESTINATION ADDRESS (518) | SOURCE PORT (520) | DESTINATION PORT (522) | PROTOCOL (524) | ACTION (526) |
|---|---|---|---|---|---|---|
| | ACL 404 | | | | | |
| 546 | 128.x.x.x | x.x.x.x | x | 80 | TCP | DENY |
| 548 | 146.115.x.x | | x | 80 | TCP | DENY AND LOG |
| 550 | x.x.x.x | x.x.x.x | x | x | x | PERMIT |

| | SOURCE ADDRESS (516) | DESTINATION ADDRESS (518) | SOURCE PORT (520) | DESTINATION PORT (522) | PROTOCOL (524) | ACTION (526) |
|---|---|---|---|---|---|---|
| | ACL 505 | | | | | |
| 552 | x.x.x.x | x.x.x.x | x | 21 | TCP | DENY |
| 554 | x.x.x.x | x.x.x.x | x | 23 | TCP | DENY |
| 556 | x.x.x.x | x.x.x.x | x | 25 | TCP | DENY |
| 558 | x.x.x.x | x.x.x.x | x | x | x | PERMIT |

FIG. 5E

| INBOUND CONFLICT RESOLUTION TABLE | | | | |
|---|---|---|---|---|
| SECURITY | ENCRYPTION | QUALITY OF SERVICE | NAT | FINAL ACTION |
| DENY | x | x | x | DENY |
| PERMIT | PERMIT | PERMIT | PERMIT | PERMIT |
| PERMIT | RE-DIRECT TO CPU | x | x | RE-DIRECT TO CPU |
| PERMIT | x | RE-DIRECT TO ALTERNATIVE FORWARDING ENGINE | x | RE-DIRECT TO ALTERNATIVE FORWARDING ENGINE |
| PERMIT | x | x | RE-DIRECT TO CPU | RE-DIRECT TO CPU |
| PERMIT AND LOG | x | x | x | RE-DIRECT TO CPU |
| DENY AND LOG | x | x | x | RE-DIRECT TO CPU |

FIG. 10A

| | 1052 | 1054 | 1056 | 1058 | 1060 | 1062 |
|---|---|---|---|---|---|---|
| | \multicolumn{6}{c}{OUTBOUND CONFLICT RESOLUTION TABLE} |
| | SECURITY | ENCRYPTION | WCCP | TCP INTERCEPT | NAT | FINAL ACTION |
| 1070 | DENY | x | x | x | x | DENY |
| 1072 | PERMIT | PERMIT | PERMIT | PERMIT | PERMIT | PERMIT |
| 1074 | PERMIT | RE-DIRECT TO CPU | x | x | x | RE-DIRECT TO CPU |
| 1076 | PERMIT | x | RE-DIRECT TO CPU No. 2 | x | x | RE-DIRECT TO CPU No. 2 |
| 1078 | PERMIT | x | x | RE-DIRECT TO DEDICATED TCP INTERCEPT PROCESSOR | x | RE-DIRECT TO DEDICATED TCP INTERCEPT PROCESSOR |
| 1080 | PERMIT AND LOG | x | x | x | x | RE-DIRECT TO CPU |
| 1082 | DENY AND LOG | x | x | x | x | RE-DIRECT TO CPU |

FIG. 10B

| | PRIORITY TABLE | | |
|---|---|---|---|
| FEATURE ACL | ACL ACTION | ACTION EXECUTED BY FORWARDING ENTITY | PRIORITY |
| SECURITY | PERMIT | SWITCH TO OUTBOUND INTERFACE | 1 |
| SECURITY | DENY | DISCARD | 3 |
| SECURITY | PERMIT AND LOG | FORWARD TO CPU | 4 |
| SECURITY | DENY AND LOG | FORWARD TO CPU | 4 |
| ENCRYPTION | PERMIT | FORWARD TO CPU | 2 |
| ENCRYPTION | DENY | SWITCH TO OUTBOUND INTERFACE | 1 |

FIG. 11

METHOD AND APPARATUS FOR ORGANIZING, STORING AND EVALUATING ACCESS CONTROL LISTS

CROSS-REFERENCE TO RELATED APPLICATIONS

This application is related to the following co-pending U.S. Patent Application:

U.S. patent application Ser. No. 09/130,890 entitled Ternary Content Addressable Memory, filed Aug. 7, 1998, and assigned to the assignee of the present application.

FIELD OF THE INVENTION

The present invention relates generally to computer networks, and more specifically, to a method and apparatus for manipulating access control lists in order to optimize their evaluation by computer network devices.

BACKGROUND OF THE INVENTION

A computer network typically comprises a plurality of interconnected entities that transmit (i.e., "source") or receive (i.e., "sink") data frames. A common type of computer network is a local area network ("LAN") which typically refers to a privately owned network within a single building or campus. LANs employ a data communication protocol (LAN standard), such as Ethernet, FDDI or Token Ring, that defines the functions performed by the data link and physical layers of a communications architecture (i.e., a protocol stack), such as the Open Systems Interconnection (OSI) Reference Model. In many instances, multiple LANs may be interconnected by to form a wide area network ("WAN"), metropolitan area network ("MAN") or intranet. These LANs and/or WANs, moreover, may be coupled through one or more gateways to the Internet.

Each network entity preferably includes network communication software, which may operate in accordance with the well-known Transmission Control Protocol/Internet Protocol (TCP/IP). TCP/IP basically consists of a set of rules defining how entities interact with each other. In particular, TCP/IP defines a series of communication layers, including a transport layer and a network layer. At the transport layer, TCP/IP includes both the User Datagram Protocol (UDP), which is a connectionless transport protocol, and TCP which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving message frames at a source port and transferring them to at least one destination port for receipt by another entity. Switches may operate at various levels of the communication stack. For example, a switch may operate at layer 2 which, in the OSI Reference Model, is called the data link layer and includes the Logical Link Control (LLC) and Media Access Control (MAC) sub-layers.

Other intermediate devices, commonly referred to as routers, may operate at higher communication layers, such as layer 3, which in TCP/IP networks corresponds to the Internet Protocol (IP) layer. IP message packets include a corresponding header which contains an IP source address and an IP destination address. Routers or layer 3 switches may re-assemble or convert received data frames from one LAN standard (e.g., Ethernet) to another (e.g. Token Ring). Thus, layer 3 devices are often used to interconnect dissimilar subnetworks. Some layer 3 intermediate network devices may also examine the transport layer headers of received messages to identify the corresponding TCP or UDP port numbers being utilized by the corresponding network entities. Such extended-capability devices are often referred to as Layer 4, Layer 5, Layer 6, Layer 7 switches or Network Appliances. Many applications are assigned specific, fixed TCP and/or UDP port numbers in accordance with Request for Comments (RFC) 1700. For example, TCP/UDP port number 80 corresponds to the hyper text transport protocol (HTTP), while port number 21 corresponds to file transfer protocol (ftp) service.

FIG. 1 is a partial block diagram of a Network Layer packet 100 corresponding to the Internet Protocol. Packet 100 includes a protocol field 104, an IP source address (SA) field 106, an IP destination address (DA) field 108 and a data field 110. FIG. 2 is a partial block diagram of a Transport Layer packet 200. Packet 200 includes a source port field 202, a destination port field 204 and a data field 206, among others. Fields 202 and 204 identify the local end points of the connection between the communicating entities and may include flow information and certain predefined or dynamically agreed-upon TCP or UDP port numbers.

Access Control Lists

Some networking software, including the Internetwork Operating System (IOS®) from Cisco Systems, Inc., supports the creation of access control lists or filters, which are typically used to prevent certain traffic from entering or exiting a network. In particular, certain layer 3 intermediate devices utilize access control lists to decide whether received messages should be forwarded or filtered (i.e., dropped) based on certain predefined criteria. The criteria may be IP source address, IP destination address, or upper-layer application based on TCP/UDP port numbers. For example, an access control list may allow e-mail to be forwarded, but cause all Telnet traffic to be dropped. Access control lists may be established for both inbound and outbound traffic and are most commonly configured at border devices (i.e., gateways or firewalls) to provide security to the network.

To generate an access control list, a network administrator typically defines a sequence of criteria statements using a conventional text editor or graphical user interface (GUI). As each subsequent statement is defined, it is appended to the end of the list. The completed list is then downloaded to the desired layer 3 intermediate device where it may be stored in the device's non-volatile RAM (NVRAM) typically as a linked list. Once an access control list has been downloaded to and stored by to the layer 3 intermediate device, individual criteria statements in the list cannot be deleted or re-ordered. To modify an existing access control list, many systems required the original list to be deleted and a new list to be created and saved.

Upon initialization, the intermediate device copies the access control list to its dynamic memory. When a packet is subsequently received at a given interface of the device, a software module of IOS® tests the received packet against each criteria statement in the list. That is, the statements are checked in the order presented by the list. Once a match is found, the corresponding decision or action (e.g., permit or deny) is returned and applied to the packet. In other words, following a match, no more criteria statements are checked. Accordingly, at the end of each access control list a "deny all traffic" statement is often added. Thus, if a given packet does not match any of the criteria statements, the packet will be discarded.

Access control lists are primarily used to provide security. Thus, for a given interface, only a single list is evaluated per direction. For purposes of security, moreover, the lists are relatively short. Nevertheless, the evaluation of such lists by software modules can significantly degrade the intermediate device's performance (e.g., number of packets processed per second). This degradation in performance has been accepted mainly due to a lack of acceptable alternatives. It is proposed, however, to expand the use of access control lists for additional features besides just security decisions. For example, access control lists may also be used to determine whether a given packet should be encrypted and/or whether a particular quality of service (QoS) treatment should be applied. Accordingly, it is anticipated that multiple access control lists may be assigned to a single interface. As additional access control lists are defined and evaluated per packet, the reduction in performance will likely reach unacceptable levels. Accordingly, a need has arisen to optimize the creation and evaluation of multiple access control lists so as to maintain, if not improve, packet processing speeds. This is especially true as more and more internetworking functionality is being implemented in hardware circuitry to increase the speed and performance of internetworking devices.

SUMMARY OF THE INVENTION

It is an object of the present invention to provide a method and apparatus for optimizing access control lists.

It is a further object of the present invention to provide a method and apparatus for merging multiple access control lists into a single list.

Another object of the present invention is to translate the format of access control lists to facilitate their manipulation and evaluation.

It is a still further object of the present invention to store access control lists in a format that facilitates rapid access and evaluation.

Briefly, the invention relates to a method and apparatus for efficiently organizing, storing and evaluating access control lists ("ACLs"). According to the invention, an ACL converter comprises a boolean transformation engine cooperatively coupled to a boolean manipulation engine for optimizing one or more text-based ACLs for subsequent evaluation by an intermediate network device. The boolean transformation engine accesses the one or more ACLs and translates them into a first boolean representation. In the preferred embodiment, the first boolean representation is a binary decision diagram (BDD). The boolean manipulation engine then optimizes and merges the ACLs specified for a given interface of the device. That is, the boolean manipulation engine performs one or more operations on the specified ACLs (in BDD format) to generate a single, unified ACL for the given interface. In order to prioritize the possibly conflicting actions output by the ACLs assigned to a given network message, the ACL converter preferably utilizes one or more predefined conflict resolution tables during the merging process.

In the illustrative embodiment, the intermediate network device includes a central processing unit (CPU), non-volatile random access memory (NVRAM) for initially storing the one or more text-based ACLs, dynamic memory and a plurality of interfaces for interconnecting network end stations and/or devices. The network device further includes an additional memory device, such as an associative or content addressable memory (CAM), portions of which may be assigned to each interface. The network device also includes the novel ACL converter which is in communicating relation with the NVRAM in order to access the ACLs, the dynamic memory and also to the CAM. Preferably, the boolean transformation engine converts the single, unified ACL from BDD format into a second boolean representation, which, in the preferred embodiment, is a sum of products (SOP) format. The single, unified ACL (in SOP format) is then mapped to that portion of the CAM associated with the given interface.

With a single, unified ACL defined per interface per direction and stored in a CAM-type memory, the intermediate network device is able to rapidly evaluate network messages. In particular, upon receipt of a packet at a first interface, a forwarding entity at the intermediate network device tests the packet against the single, unified ACL stored in the corresponding portion of the CAM. When a match is obtained, the corresponding decision is returned to the forwarding entity, which then takes the appropriate action (e.g., forward, discard, log and forward, transfer to CPU for additional processing, etc.) Since the intermediate network device only evaluates a single, unified ACL stored in the CAM, rather than multiple ACLs stored in RAM, a decision can be rapidly obtained.

Accordingly, the processing and forwarding of packets by the network device is substantially improved.

BRIEF DESCRIPTION OF THE DRAWINGS

The above and further advantages of the invention may be better understood by referring to the following description in conjunction with the accompanying drawings, in which:

FIGS. 5A–5E are schematic representations of text-based access control lists;

FIGS. 10A and 10B are schematic representations of conflict resolution tables for use with the present invention;

FIG. 11 is a schematic representation of a priority table for use with the present invention.

DETAILED DESCRIPTION OF THE PREFERRED EMBODIMENT

Figure 3:
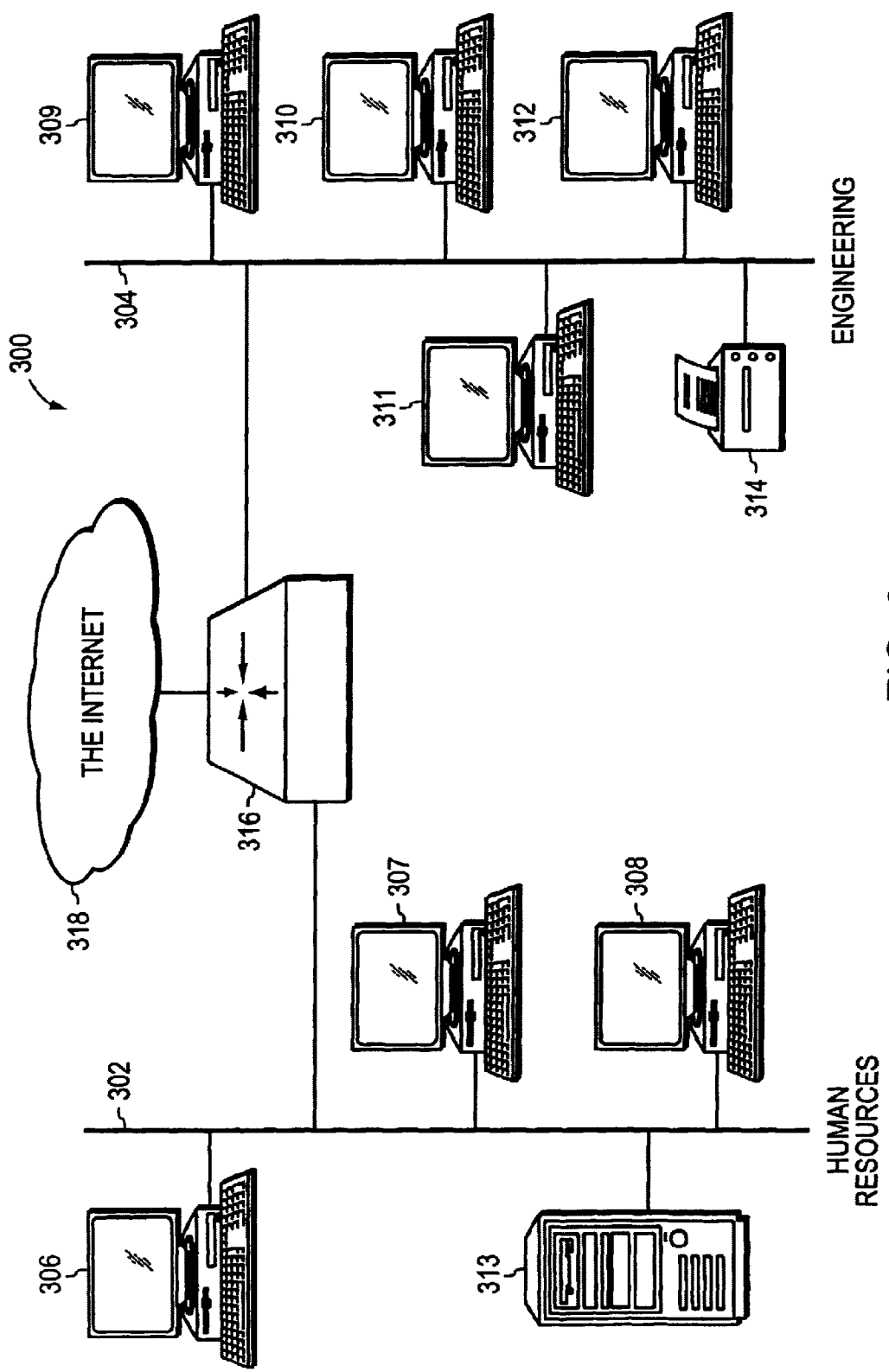
FIG. 3 is a highly schematic diagram of a computer network.

FIG. 3 is a highly schematic block diagram of a computer network 300. Network 300 includes a plurality of local area networks (LANs), such as LAN 302 and 304, each of which may be associated with a different department, such as human resources and engineering, respectively. A plurality of end stations, such as end stations 306–312, and servers, such as servers 313 and 314, may be coupled to LANs 302, 304. LANs 302 and 304 may also be interconnected by an intermediate network device 316. Device 316 may also provide LANs 302 and 304 with connectivity to other networks, such as the well-known Internet 318. Software entities (not shown) executing on the various end stations 306–312 and servers 313 and 314 typically communicate with each other by exchanging discrete packets or frames according to predefined protocols, such as the Transmission Control Protocol/Internet Protocol (TCP/IP), the Internet Packet Exchange (IPX) protocol, the AppleTalk protocol, the DECNet protocol or NetBIOS Extended User Interface (NetBEUI).

Preferably, intermediate network device 316 is a layer 3 intermediate device and thus operates up to the network layer of the communication protocol stack implemented within the network 300. For example, device 316 preferably includes an Internet Protocol (IP) software layer. Device 316 may also implement network services such as route processing, path determination and path switching functions. In the illustrated embodiment, device 316 is a computer having transmitting and receiving circuitry and components, including network interface cards (NICs), establishing physical ports and interfaces for exchanging network messages.

The term layer 3 intermediate device as used herein are intended broadly to cover any intermediate device operating primarily at the internetwork layer, including, without limitation, routers as defined by Request for Comments (RFC) 1812 from the Internet Engineering Task Force (IETF), intermediate devices that are only partially compliant with RFC 1812, intermediate devices that provide additional functionality, such as Virtual Local Area Network (VLAN) support, IEEE 802.1Q support and/or IEEE 802.1D support, etc. Nonetheless, it should be understood that the present invention may also be utilized in whole or in part with other intermediate network devices, such as switches and/or layer 2 intermediate devices, which are also intended to broadly cover any intermediate device operating primarily at the data link layer, including, without limitation, devices that are fully or partially compliant with the IEEE 802.1D MAC Bridge standard and intermediate devices that provide additional functionality, such as Virtual Local Area Network (VLAN) support, IEEE 802.1Q support and/or IEEE 802.1p support, Asynchronous Transfer Mode (ATM) switches, Frame Relay switches, etc.

It should be understood that the network configuration 300 of FIG. 3 is for illustrative purposes only and that the present invention will operate with other, possibly far more complex, network topologies.

Figure 4:
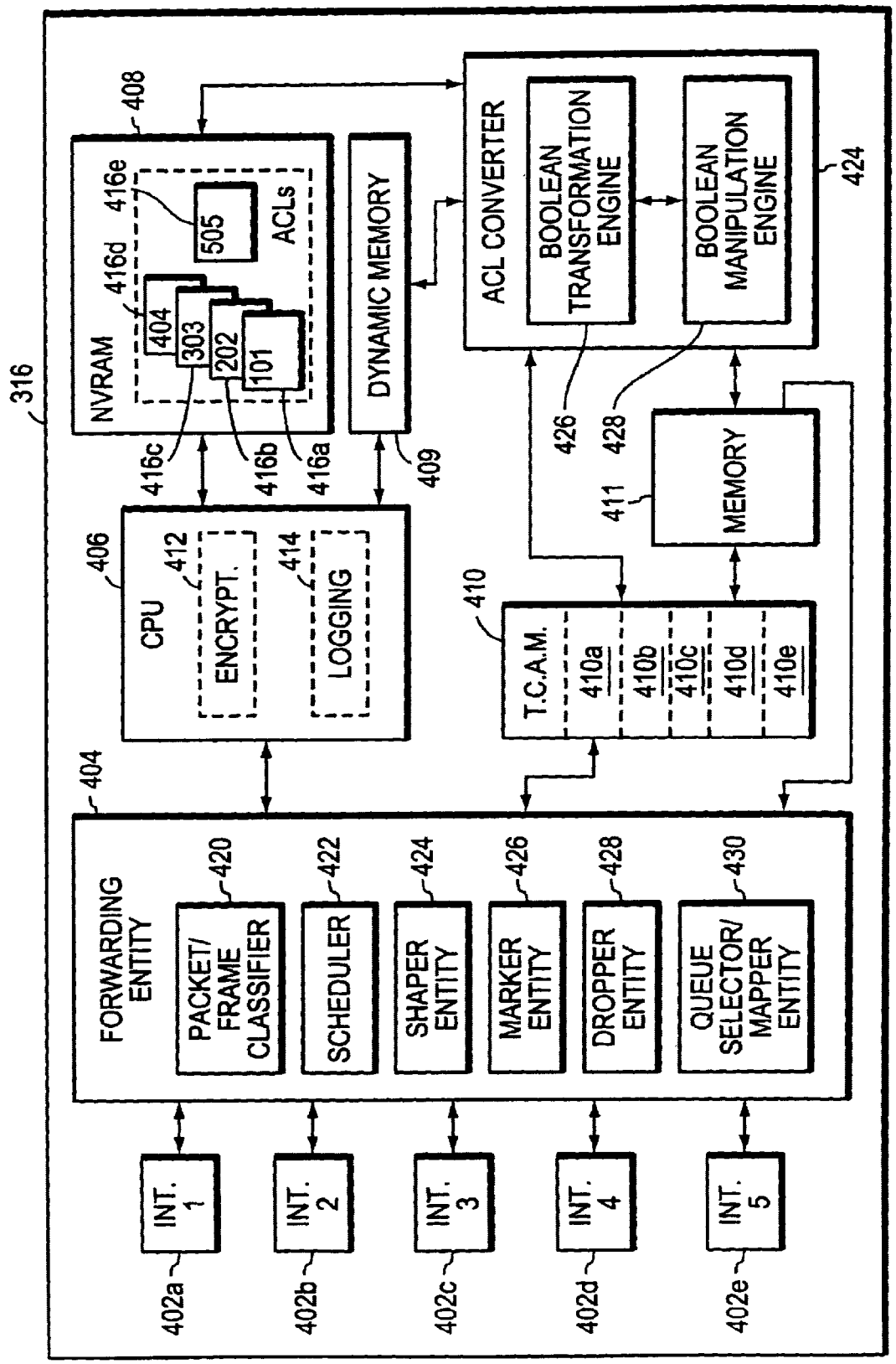
FIG. 4 is a highly schematic, partial block diagram of an intermediate network device in accordance with the present invention.

FIG. 4 is a partial block diagram of the intermediate network device 316. Device 316 preferably includes a plurality of interfaces 402a–402e that provide connectivity to the network 300. That is, interfaces 402a–402e are in communication with LANs 302 and 304 and Internet 318. Each interface 402a–e, moreover, may be associated with one or more physical ports (not shown). Device 316 further includes at least one forwarding entity 404, a central processing unit (CPU) 406, non-volatile random access memory (NVRAM) 408, dynamic memory 409 and at least one content addressable or associative memory 410. The associative memory 410 is preferably a ternary content addressable memory (TCAM), and its cells (not shown) may be associated with or assigned one of three values, such as "0", "1" or "don't care". Associated with and coupled to the TCAM 410 is another memory device 411, such as a dynamic random access memory. Memory 411 preferably includes a plurality of spaces or locations, such that each entry or row of the TCAM 410 has a corresponding location or space in memory 411.

CPU 406, which may be configured to run a plurality of executable functions, such as an encryption algorithm 412 and a logging function 414, is coupled to NVRAM 408, which may contain one or more text-based access control lists (ACLs) 416a–416e, such as ACLs 101, 202, 303, 404 and 505, and also to dynamic memory 409. Forwarding entity 404 may include a plurality of conventional sub-components configured to implement QoS treatments, such as a packet/frame classifier 420, a scheduler 422, a shaper entity 424, a marker entity 426, a dropper entity 428, and a queue selector/mapping entity 430. The forwarding entity 404 is also coupled to the CPU 406, the TCAM 410, which may be apportioned into segments 410a–e whereby each segment 410a–e corresponds to a particular interface 402a–e, and memory 411. As described below, the forwarding entity 404 is basically configured to forward or switch network messages among the various interfaces 402a–e of device 316.

It should be understood that each TCAM segment 410a–e may be further apportioned or sub-divided. For example, each TCAM segment 410a–e may be apportioned into input and output sections.

Device 316 further includes an access control list (ACL) converter 424. ACL converter 424 is operatively coupled to NVRAM 408 for accessing the text-based ACLs 416a–e, dynamic memory 409 for processing the ACLs 416a–e, and to TCAM 410 and its associated memory 411 for storing modified versions of the ACLs 416a–e, as described below. ACL converter 424 includes a boolean transformation engine 426 and a boolean manipulation engine 428. Engines 426 and 428 preferably comprise programmed processing elements containing soft ware programs, such as software modules or libraries, pertaining to the methods described herein and executable by the processing elements. Other computer readable media may also be used to store and execute the program instructions. The engines 426 and 428 are also arranged in communicating relationship by communications means.

It should be understood that ACL converter 424, including boolean transformation engine 426 and boolean manipulation engine 428, may run on or otherwise be executed by CPU 406 or some other processing element (not shown). ACL converter 424 and engines 426 and 428 may also be implemented in hardware through a plurality of registers and combinational logic configured to produce sequential logic circuits and cooperating state machines. Those skilled in the art will recognize that other combinations of software and hardware implementations may be utilized.

A suitable platform for intermediate network device 316 are the Catalyst 8500® series of switch routers and/or the Catalyst® 6000 family of multi layer switches both from Cisco Systems, Inc. A suitable TCAM 410 for use with the present invention is described in co-pending U.S. patent application Ser. No. 09/130,890, filed Aug. 7, 1998, which is hereby incorporated by reference in its entirety. Suitable TCAMs for use with the present invention are also commercially available from NetLogic Micro systems, Inc. of Mountain View, Calif. or from Music Semiconductors of Hackettstown, N.J. It should be understood that a Dynamic CAM, which also has the ability to store "don't cares" may alternatively be used. Those skilled in the art will also recognize that the same function can be achieved with two Static CAMs, which provide four possible states. To implement the "don't care" value, the TCAM 410 may be segregated into blocks of cells (each cell being either asserted or de-asserted) such that each block has a corresponding mask that determines whether the particular cells of its block are "care" or "don't care".

Creation and Assignment of ACLs to Interfaces

First, a network administrator creates one or more access control lists in a conventional manner. For example, the administrator preferably utilizes a conventional text editor at a management station (not shown) to create the access control lists. FIGS. 5A–5E are highly schematic representations of text-based ACLs 416a–416e, respectively. Each access control list, such as ACL 416a, is given a name, such as ACL 101, and is preferably arranged in a table array having multiple rows and columns. Each row of the ACL, such as ACL 416a, corresponds to an Access Control Entry (ACE) statement, such as ACE statements 502–514, which specify the various criteria for the ACL 416a. The columns of the ACL represent the specific criteria with which network messages are compared. For example, ACLs 416a–416d each include a separate column for source address 516, destination address 518, source port 520, destination port 522 and protocol 524. Those skilled in the art will understand that greater or fewer message criteria may be employed. In addition, each ACL includes an action column 526 that corresponds to the particular action that is to be applied to network messages matching a corresponding ACE statement. In the preferred embodiment, permissible actions include permit, deny, permit and log, and deny and log.

Those skilled in the art will understand that other actions may be specified. For example, a possible action may be to execute a particular program stored in the non-volatile or dynamic memory of the device. That is, the action of a first ACE may be to execute application "abc", while the action of a second ACE is to execute application "xyz". Another possible action is to return a tag to be concatenated with other fields of the message (e.g., fields other than those used for comparison with the first ACL) and compare this concatenated tag and the other fields with the ACEs of a second ACL. This may be useful for determining patterns that exceed the size of the associative memory or TCAM 410.

A set of ACLs may also be defined for performing rate-limit or other commands. In this case, each ACL may be associated with a particular traffic specifier and the actions may be conform or exceed. If the returned action is exceed (e.g., permit), then the corresponding traffic specifier should be evaluated. If the returned action is conform (e.g., deny), then the evaluation process should jump to the next ACL in sequence.

The text-based ACLs that are to be utilized at a given intermediate device are then downloaded to that device in a conventional manner and stored, preferably in non-volatile memory. In particular, the ACLs may be maintained in memory as ASCII text or in other formats. For example, ACLs 416a–416e may be downloaded to device 316 by the network administrator and stored at NVRAM 408. Next, the network administrator preferably assigns one or more ACLs 416a–e to each interface 402a–e per direction (e.g., inbound or outbound) and associates a given function or "feature" with each of the assigned ACLs. In the preferred embodiment, the network administrator utilizes one ACL for security and one or more other ACLs to implement additional features at the interface per direction.

For example, the network administrator may assign ACL 416a (ACL 101) to interface 402a for purposes of input security control. Accordingly, upon receipt of a network message at interface 402a, it is compared with ACE statements 502–514 of ACL 416a. The matching is preferably performed logically as a series of sequential steps starting with the first ACE and moving, one ACE at a time, toward the last ACE in the ACL. Once a match is located, the corresponding action is returned and the processing stops. That is, no additional ACEs are examined. If a match is made with an ACE statement having a "permit" action (e.g., ACE 502), the packet is forwarded. If a match is made with an ACE statement having a "deny" action (e.g., ACE 506), the packet is dropped. If the matching action is "permit and log", then the respective message is forwarded and an entry is made in a conventional message log. Similarly, if the matching action is "deny and log", then the respective message is dropped and a log entry made. If no ACE of the subject ACL matches the message, an implicit action located at the end of the ACL is typically returned (e.g., permit or deny).

Figure 1:
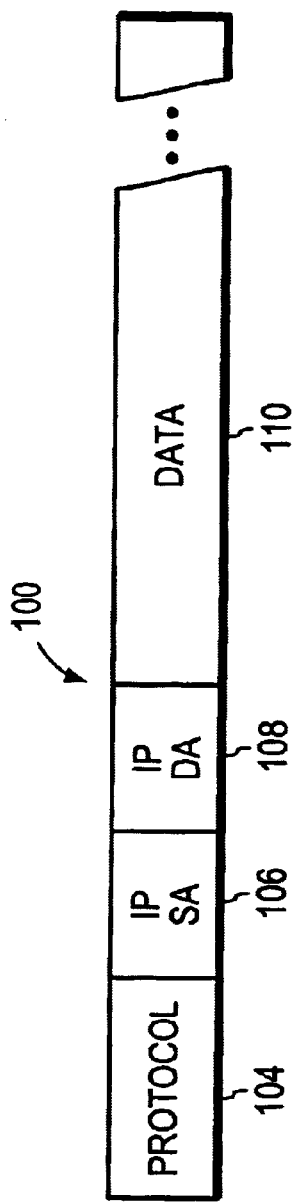
FIGS. 1 and 2, previously discussed, are block diagrams of conventional network messages.
Figure 2:
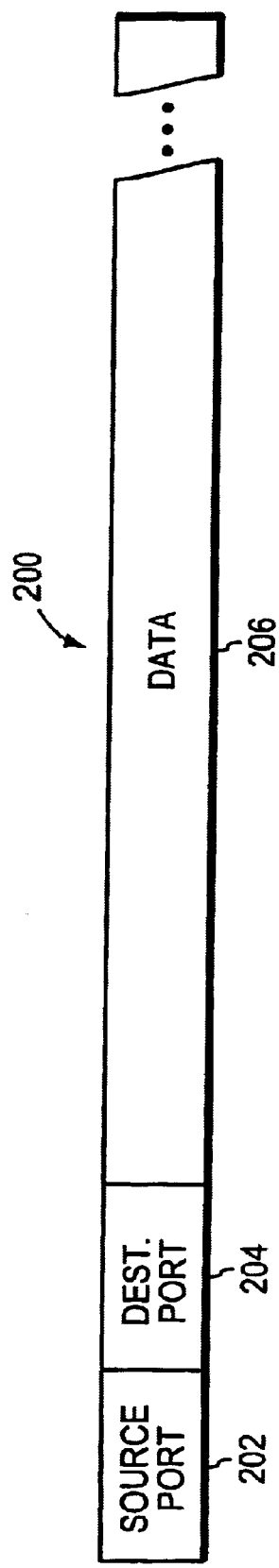

The value "x" of ACLs 416a–416e represents a wildcard. That is, the specified action is independent of the value of "x" of the message being tested. As shown in ACL 416a, a message having a source address of 1.2.3.3 specified in its IP SA field 104 (FIG. 1) is always forwarded, regardless of the values contained in its IP DA field 108, source port field 202 (FIG. 2), destination port field 204 or the protocol field 104.

ACL 416b (ACL 202), which includes ACE statements 530–536, may be used to implement output security at one or more interfaces. Here, if a packet matches an ACE statement having a permit action, then the packet is forwarded from the interface. If the matching action is deny, then the packet is dropped (i.e., it is not forwarded from the interface). ACLs 416c–416e may be utilized by the network administrator to implement additional features at interface 402a. For example, ACL 416c (ACL 303), which includes ACE statements 538–544, may be associated with an encryption function. If a packet matches an ACE statement of ACL 416c having a "permit" action, then the packet is encrypted. If the packet matches an ACE having a "deny" action, then the packet is not encrypted.

ACL 416d (ACL 404), which includes ACE statements 546–550, may be defined by the network administrator to implement TCP intercept at interface 402a. TCP intercept is a well-known technique used to prevent malicious users from overwhelming a web server with invalid connection requests. With TCP intercept, an intermediate device examines the source address of messages requesting access to a web server to ascertain whether the source is valid. If the source is valid, the request is permitted. If not, the request is dropped before ever reaching the web server. For ACL 416d, a "permit" action preferably means that TCP intercept processing should be performed. If the matching action is "deny", then no TCP intercept processing is required (e.g., the source of the request message is known to be a valid source). ACL 416e (ACL 505), which includes ACE statements 552–558, may be defined by the network administrator to apply one or more QoS treatments to particular messages at interface 402a. That is, QoS treatments are applied to messages matching ACE statements having "permit" actions. If the matching action is "deny", then no QoS treatment is applied to the message.

The network administrator similarly assigns one or more ACLs to each of the remaining interfaces 402b–402e at device 316 and associates each assigned ACL with a particular function or feature. For example, the network administrator may assign ACLs 416a–416e to interface 402a, ACLs 416a, 416b and 416c to interface 402b, ACLs 416a, 416b, 416d and 416e to interface 402c and so on. It should be understood, moreover, that ACLs 416a–416e may be associated with different features depending on the interface to which they are assigned. For example, at interface 402b, the network administrator may assign ACL 416b and associate it with a Network Address Translation (NAT) function. Similarly, ACL 416b at interface 402c may be associated with a web cache control protocol (WCCP) function and so on. It should be further understood that additional ACLs may be defined and downloaded by the network administrator.
Translation of Access Control Lists into Binary Decision Diagram Representation Once the text-based ACLs have been downloaded to device 316, stored at NVRAM 408 and assigned to a particular interface, the ACL converter 424 proceeds to optimize them. In sum, ACL converter 424 transforms the text-based ACLs into corresponding boolean Binary Decision Diagram ("BDD") representations. The ACL converter 424 then merges all of the ACLs assigned to each interface into a single, unified ACL and stores these single, unified ACLs in the TCAM 410 for subsequent use by the forwarding entity 404. It should be understood that each ACE statement of an ACL is basically a function written in an "if condition, then action" format. The condition statement, moreover, corresponds to the particular criteria (e.g., IP SA=2.5.4.x and Source Port=100) and the action corresponds to the ACL output (e.g., permit, deny, etc.)

It should be further understood that, to the extent one or more ACLs at NVRAM 408 are not assigned to any interface, these un-assigned ACLs may remain unmodified in order to conserve processor and memory resources at the respective intermediate device.

Figure 6:
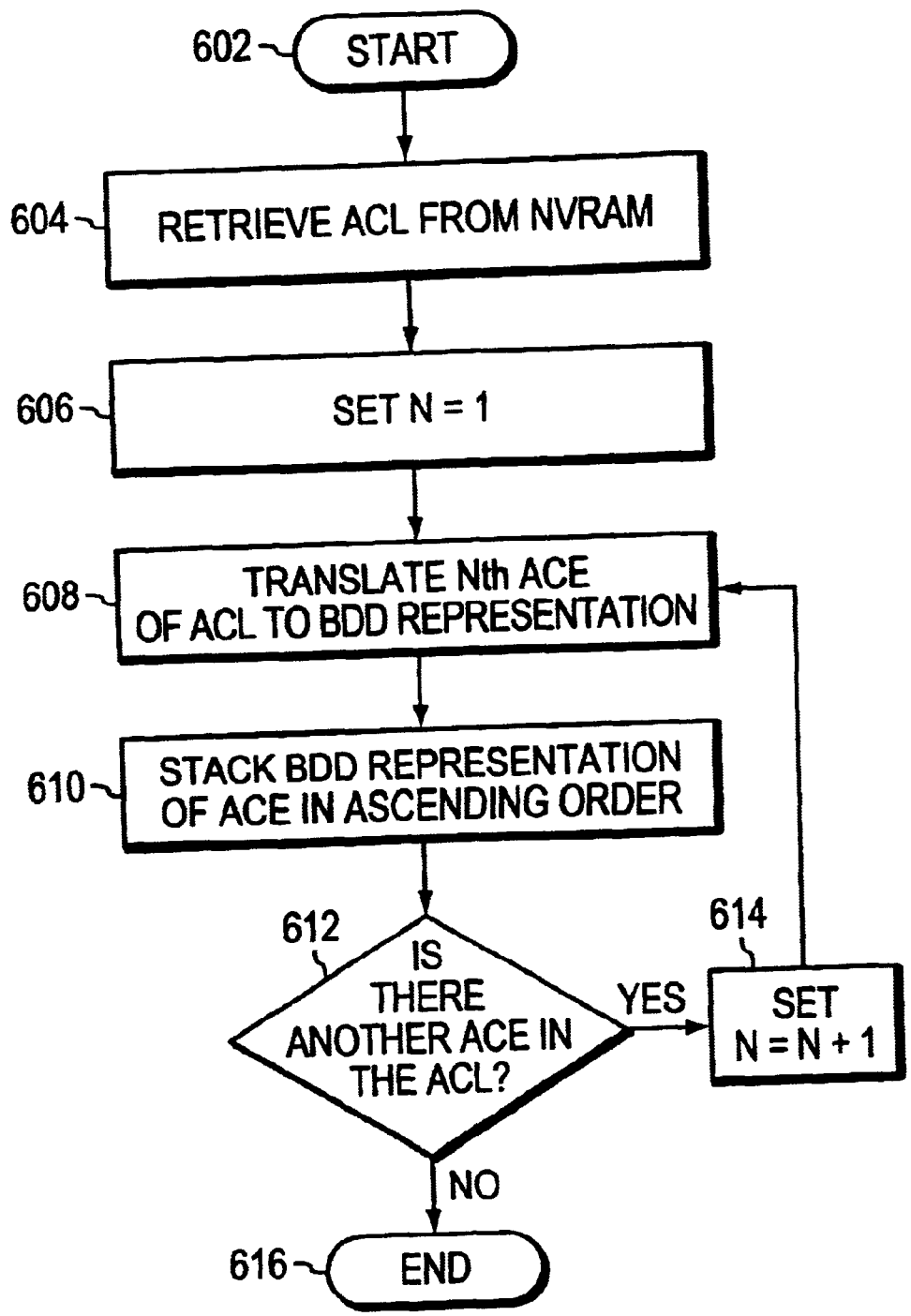
FIGS. 6–7, 9A, 9B and 12 are flow diagrams of the methods of the present invention.

FIG. 6 is a flow diagram of the steps performed by the ACL converter 424 for converting the individual ACE statements of a given ACL into BDD format. The process begins at start block 602. First, the ACL converter 424 retrieves a given text-based ACL, such as ACL 416a, from NVRAM 408, as indicated at block 604. Next, the ACL converter 424 sets a counter N to 1, as indicated at block 606. The boolean transformation engine 426 of the ACL converter 424 then translates the Nth ACE statement of ACL 416a into a BDD representation, as indicated at block 608. Since N initially equals 1, the boolean transformation engine 426 starts with the first ACE statement, e.g., ACE 502, of ACL 416a. A suitable process for converting a text-based ACE statement into BDD representation is disclosed in G. Hachtel and F. Somenzi *Logic Synthesis and Verification Algorithms* (Kluwer Academic Publishers 1996) at pp. 225–226, which is hereby incorporated by reference in its entirety.

In the preferred embodiment, the BDD representations generated by the present invention are reduced-ordered BDD representations. That is, the BDD representations are ordered in the sense that variables appear in the same order along all paths of the BDD representation, and reduced in that there are no isomorphic subgraphs or redundant nodes. A description of reduced-ordered BDD representations can be found in the *Logic Synthesis* text at pp. 226–231. Accordingly, the term BDD as used herein generally refers to a reduced-ordered BDD.

The boolean transformation engine 426 then places the BDD representation of ACE 502 in a stack, as indicated at block 610. At this point, the BDD representation of ACE 502 is the only item in the stack. Next, the boolean transformation engine 426 determines whether there is another ACE in the subject ACL, as indicated at block 612. If so, the boolean transformation engine 426 increments N by 1, as indicated at block 614, and returns to block 608, where it translates the second ACE statement, e.g., ACE 504, and adds (e.g., "pushes") the BDD representation for ACE 504 onto the top of the stack containing the BDD representation for ACE 502. This process is continued by the boolean transformation engine 426 until all of the ACE statements in the subject ACL have been processed, at which point the response to block 612 is no and the process is complete as indicated by end block 616. At this point, all of the ACE statements (e.g., ACEs 502–514) for the subject ACL (e.g., ACL 416a) have been translated into BDD format and stacked. Furthermore, the BDD associated with ACE 502 is at the bottom of the stack and the BDD associated with ACE 514 is at the top of the stack.

It should be understood that the ACL converter 424, rather than forming a stack, may form one or more other data structures, such as a list, etc.

Figure 7:
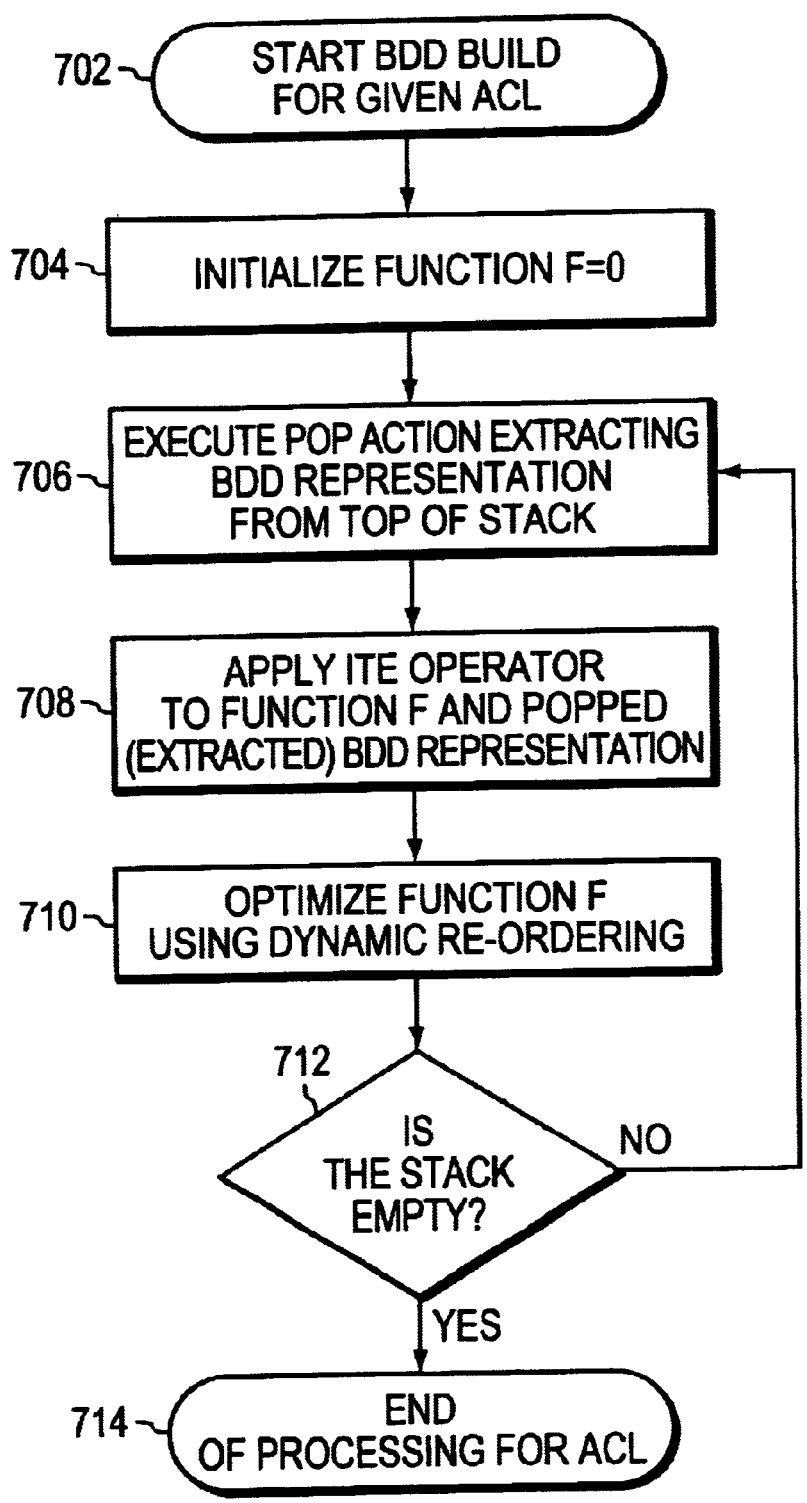

The ACL converter 424 next proceeds to build a BDD representation for the entire ACL (e.g., ACL 101) by merging the BDDs generated for the individual ACEs (e.g., ACEs 502–514). FIG. 7 is a flow diagram of the steps performed by the ACL converter 424 to merge the ACEs of a given ACL into a single BDD representation. The process preferably begins at start block 702. First, the boolean manipulation engine 428 initializes a selected function, F, to zero, as indicated at block 704. The function F simply represents a boolean function that, at the end of the process, will represent the subject ACL (e.g., ACL 416a) in BDD format. As indicated at block 706, the boolean manipulation engine 428 then "pops" the BDD representation for the ACE statement from the top of the stack generated in connection with the steps of FIG. 6. The boolean manipulation engine 428 then applies an If-Then-Else (ITE) operator to the popped BDD representation and the current function F, thereby generating a new version of the function F (e.g., F'), as indicated at block 708. Suitable techniques for applying an ITE operator to two boolean functions (i.e., the BDD representation of the ACE statement and the function F) are disclosed in the *Logic Synthesis* text at pp. 234–237.

Next, the boolean manipulation engine 428 preferably optimizes the new version of the function F (i.e., F') using dynamic re-ordering, as shown by block 710. Dynamic re-ordering is a well known optimization technique and will not be described in detail here. A description of dynamic re-ordering as applied to BDDs can be found in R. Rudell *Dynamic Variable Ordering for Ordered Binary Decision Diagrams* from the Institute of Electrical and Electronics Engineers (IEEE), which is hereby incorporated by reference in its entirety. Preferably, the dynamic re-ordering of block 710 takes place as the BDD for the subject ACL is being built. The boolean manipulation engine 428 next determines whether the stack is empty, as indicated at block 712. If not, the process returns to block 706 and the BDD representation for the next ACE statement in the stack is popped. The ITE operator is then applied to this new BDD representation and the current version of the function F (i.e., F') to generate a new version of the function F. This loop is repeated until each of the BDD representations for the ACE statements in the stack have been processed and optimized, as indicated at block 714. At the end of this process, a single, optimized BDD representation for the entire ACL (e.g., ACL 416a) will have been generated by the ACL converter 424.

It should be understood that the ITE operator may be replaced by an appropriate combination of other operators, such as AND, OR, NOT, etc.

Figure 8:
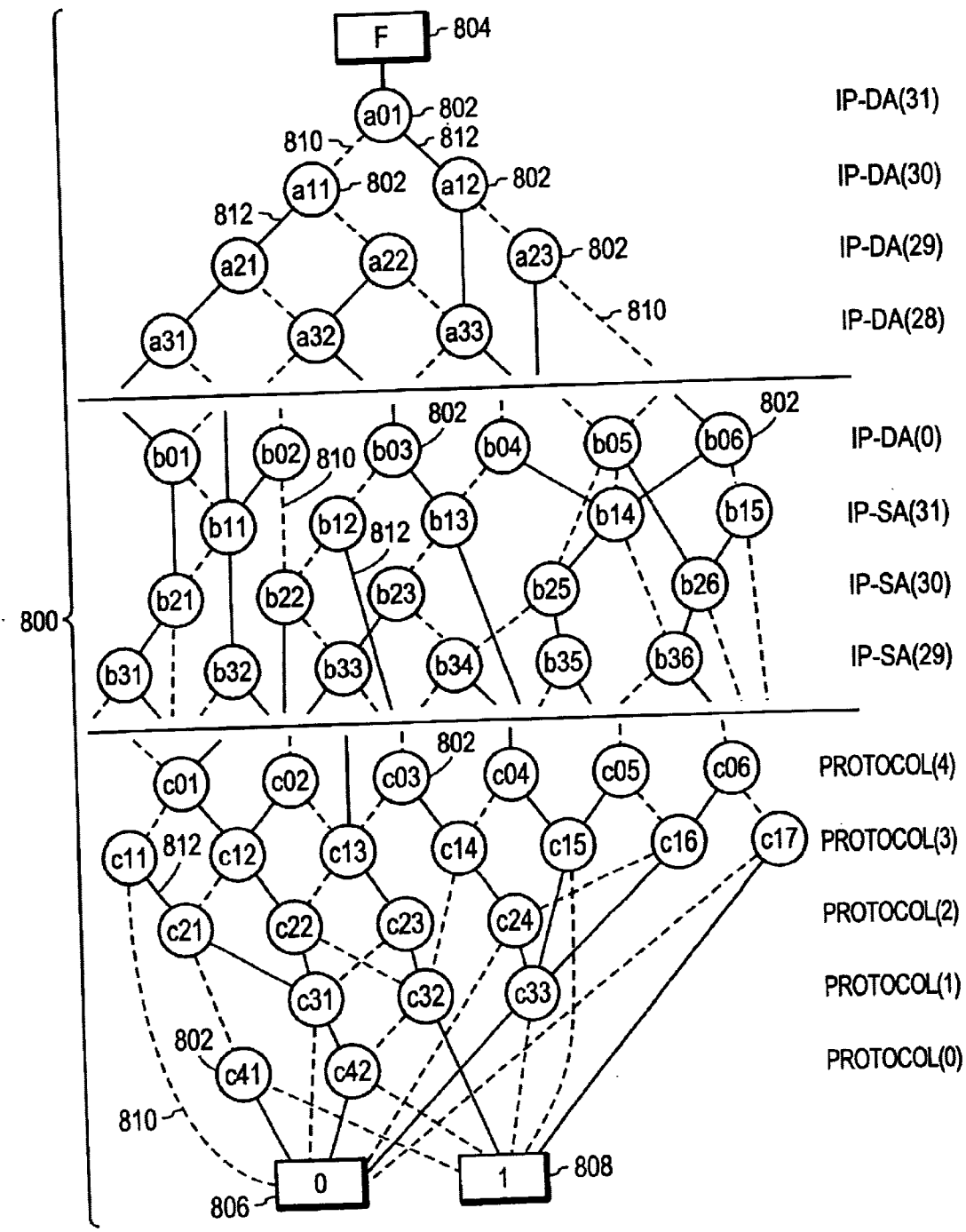
FIG. 8 is a schematic representation of an access control list in BDD format.

FIG. 8 is a highly schematic, partial representation of a preferred ACL 800 in BDD format. ACL 800 includes a plurality of interconnected nodes 802 that are arranged in levels. Each node 802, moreover, has a handle or label (e.g., a01, a11, a12, a21, a22, a23, a31, etc.) that identifies the respective node 802. The ACL 800 further includes a top entry point or root 804 and two decision points 806 (e.g., "0") and 808 (e.g., "1"). Each level of the BDD 800 (and all nodes 802 on that level) preferably corresponds to a particular bit from an ACE criteria statement of the corresponding ACL. For example, the top 4 levels of BDD 800 correspond to the four least significant bits of an IP DA, which is 32 bits long. That is, level 1 which is labeled IP-DA[31] corresponds to the thirty-first bit of the IP DA. Level 2, which is labeled IP-DA[30] corresponds to the thirtieth bit of the IP DA and so on down to level IP-DA[0], which corresponds to the first bit of the IP DA. Following the levels for the IP-DA are levels for each bit of the IP SA, which are labeled IP-SA[31], IP-SA[30], IP-SA[29] and so on. Only a partial number of the levels of BDD 800 are shown for clarity. Toward the bottom of BDD 800 are the levels corresponding to the Protocol of the message (e.g., as provided in field 104 of IP packet 100). In this illustration, dotted interconnection lines 810 represent true arcs (i.e., the result from testing at the higher level node is true) and solid interconnection lines 812 represent else arcs (i.e., the result from testing at the higher level node is false). Other conventions, such as showing then arcs as solid lines and else arcs as dotted lines, may also be used.

The two decision blocks 806 and 808 at the bottom of the BDD 800 correspond to the decision of the particular ACL (e.g., permit or deny). For a given ACL having more than two decisions (e.g., permit, deny, permit and log, and deny and log), multiple BDDs each having two decisions are formed and combined by the ACL converter 424. For example, the results of a first BDD may be permit or deny, while the results of a second BDD may be log or not-log. By traversing the nodes of both BDDs, the correct result may be obtained (e.g., permit and log).

In the preferred embodiment, the ACL converter 424 stores the optimized BDD representation for ACL 416a in dynamic memory 409 and processes the remaining ACLs (e.g., ACLs 416b–416e) in a similar manner. Accordingly, an optimized BDD representation for each ACL 416a–416e is generated and temporarily stored at dynamic memory 406.

The ACL converter 424 next determines which ACLs have been assigned to a given interface and what features have been associated with the assigned ACLs. As described below, for each interface, the ACL converter 424 proceeds to generate a single, unified ACL in BDD format that combines all of the ACLs that have been assigned thereto.

Creation of Single, Unified ACL for Each Interface

Once a network administrator assigns more than one ACL to a given interface problems may arise should a given message match conflicting actions from multiple ACLs. For example, a security ACL may return a deny action, and an encryption ACL may return a permit action. Obviously, the message should be dropped and not encrypted. Accordingly, a method for solving potential conflicts among multiple ACLs assigned to a single interface is required. In addition, the forwarding entity 404 may not be capable of performing some actions specified by the ACLs. For example, if an encryption algorithm is only executable by the CPU 406 (as opposed to the forwarding entity 404 itself), then a permit action from an encryption ACL requires that the message be forwarded to the CPU 406 for encryption, assuming the corresponding action from the security ACL is also permit.

It is also possible that the intermediate device 316 may have a special CPU or ASIC (not shown) that is dedicated to performing encryption tasks. In this case, the message must be forwarded by the forwarding entity 404 to this special CPU or ASIC and not to the main CPU 406 for encryption. In the preferred embodiment, the detection and resolution of such potential conflicts is performed by the ACL converter 424 as it merges the ACLs assigned to a given interface into a single, unified ACL. For example, the ACL converter 424 may rely on one or more conflict resolution tables, which essentially prioritize the possible actions from multiple, conflicting ACLs, as described below.

Figure 9A:
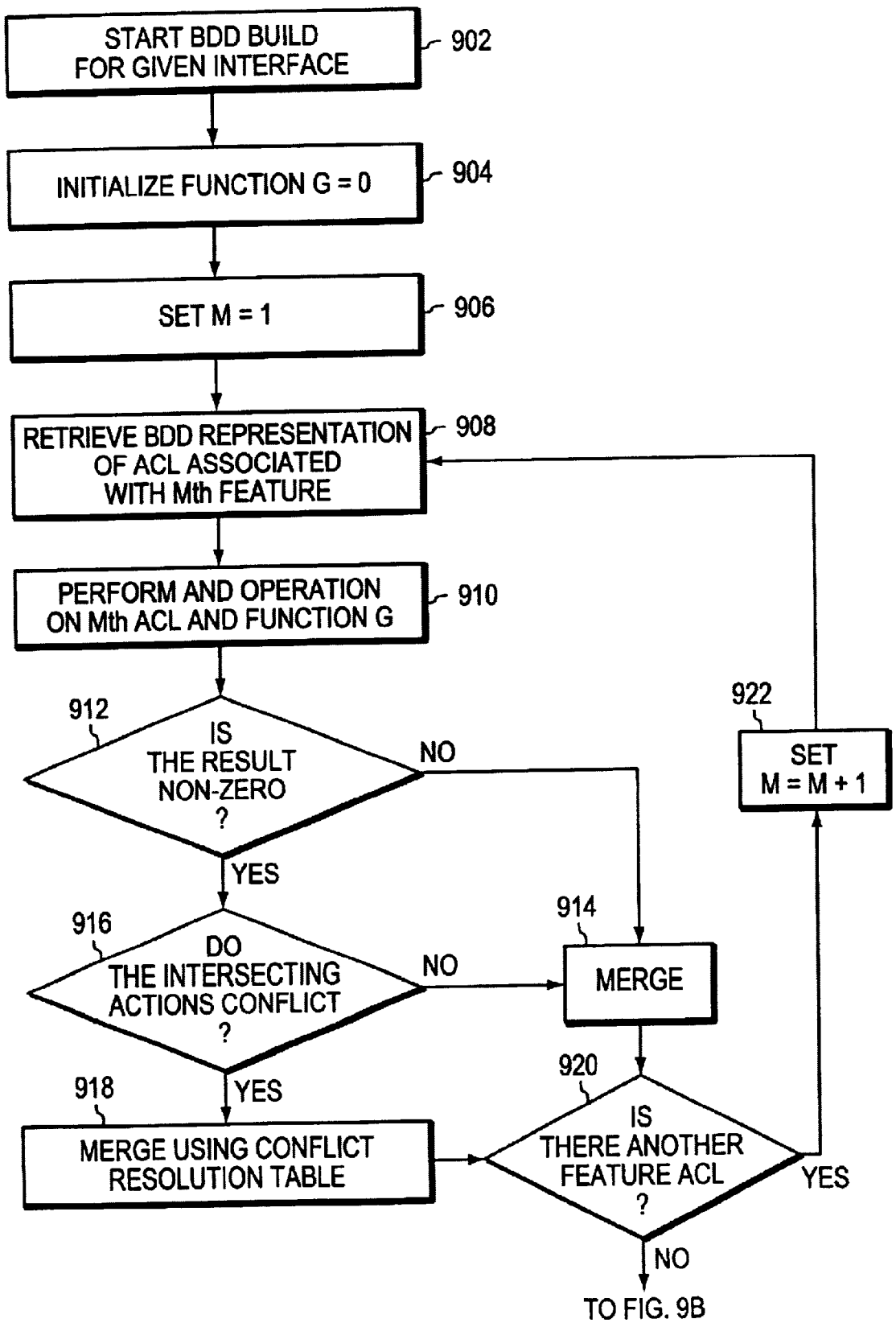
Figure 9B:
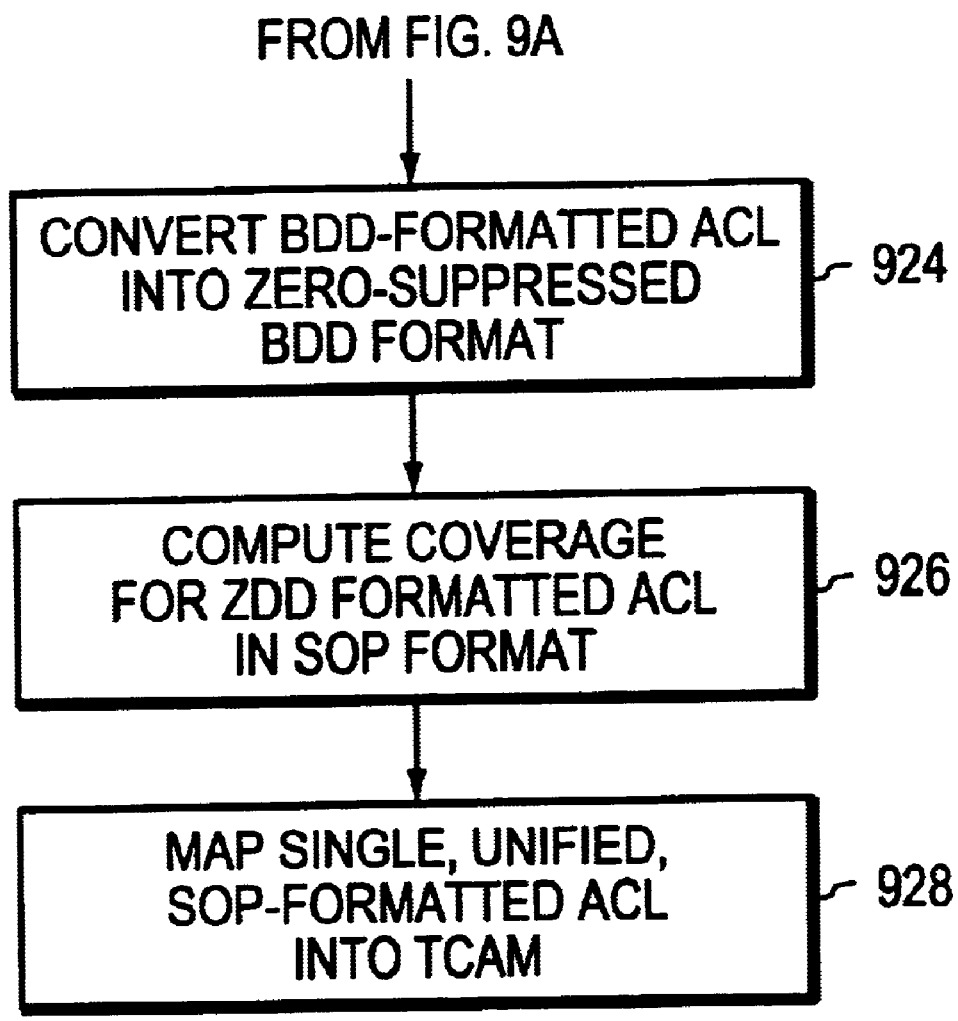

FIGS. 9A–9B are a flow diagram of the steps performed by the ACL converter 424 to generate a single, unified ACL for a given interface. The process begins at start block 902 in which the boolean manipulation engine 428 of the ACL converter 424 selects a particular interface (e.g. interface 402a). Next, the boolean manipulation engine 428 initializes a selected boolean function, G, to zero, as indicated at block 904. The function G represents the function for the single, unified ACL that is being built for the interface. The boolean manipulation engine 428 also sets a counter M to 1, as indicated at block 906. Next, the boolean manipulation engine 428 retrieves the optimized BDD representation for the Mth ACL associated with interface 402a from dynamic memory 409, as indicated at block 908. As described above in connection with FIG. 7, each of the text-based ACLs downloaded into NVRAM 408 by the network administrator have been translated and optimized into a BDD representation and stored at dynamic memory 409. For example, assuming the first ACL assigned to interface 402a is ACL 416a, which is associated with input security, the boolean manipulation engine 428 retrieves the BDD representation of ACL 416a.

Next, the ACL converter 424 determines whether the retrieved ACL conflicts with the unified ACL being built for the selected interface, which is represented by the boolean function G. Two ACLs conflict if their criteria statements have a non-null intersection and the respective actions from the intersecting criteria statements call for different outcomes. To identify any non-null intersections, the ACL converter 424 preferably performs an AND operation on the criteria statements of the Mth ACL and the boolean function G, as indicated at block 910. ACL converter 424 then determines whether the result is non-zero, as indicated at decision block 912. If the result of the AND operation is zero (meaning that there is no conflict between the Mth ACL and the unified ACL being built), then the ACL converter 424 merges the Mth ACL into the function G, as indicated at block 914. The merging step of block 914 basically consists of building the union of the Mth ACL (which was retrieved at block 908) and the current version of the boolean function G to create a new version of the function G. Preferably, this union is formed by performing an OR operation on the Mth ACL and function G.

If the result of the AND operation is non-zero, then the ACL converter 424 next determines whether the actions specified by the intersecting criteria statements are conflicting, as indicated at block 916. In particular, the ACL converter 424 examines each intersection and determines whether the corresponding action specified by the Mth ACL is different from the corresponding action specified by the current version of the function G. If none of the intersecting criteria statements conflict, the ACL converter 424 proceeds to merge the Mth ACL into the function G, as indicated by block 914, described above.

If the intersecting criteria statements are in conflict, there are at least three options. The ACL converter 424 can adopt the action specified by the Mth ACL, it can adopt the action specified by the function G, or it can adopt an entirely new action based on the particular conflict. There are also several ways to implement a desired option. For example, the conflict could be reported to the network manager. In response, the network manager could examine the intersecting criteria statements and try to eliminate the conflict by modifying the corresponding ACLs. The process would then be re-started with the modified ACLs, which presumably should not result in any conflicts. In the preferred embodiment, the ACL converter 424 resolves detected conflicts itself without any input from or modifications by the network administrator. More specifically, the boolean manipulation engine 428 resolves detected conflicts by resorting to one or more predefined conflict resolution tables, as indicated at block 918, thereby allowing the Mth ACL to be merged with the function G.

FIGS. 10A and 10B are a highly schematic representations of conflict resolution tables for use with the present invention. In particular, FIG. 10A represents a preferred conflict resolution table 1000 for use on the inbound side of an interface and FIG. 10B represents a preferred conflict resolution table 1050 for use on the outbound side of an interface. Inbound conflict resolution table 1000 may be arranged in a table format and include a plurality of columns each corresponding to a possible ACL feature that may be assigned to a given inbound interface. For example, a first column 1002 corresponds to a security ACL, a second column 1004 corresponds to an encryption ACL, a third column 1006 corresponds to a QoS ACL and a fourth column 1008 corresponds to a NAT ACL. Another column 1010 presents the merged action to be implemented by the forwarding entity in response to the actions specified by the ACL features of columns 1002–1008. The final or merged actions to be implemented by a given forwarding entity may include permit, deny, forward to CPU for additional processing (e.g., encryption, logging, etc.), forward to an alternative forwarding entity, etc. The conflict resolution table 1000 also includes a plurality of rows 1012–1024, which represent the possible combinations of conflicting actions from the ACL features of columns 1002–1008.

Outbound conflict resolution table 1050 is similarly configured. In particular, table 1050 includes a plurality of columns 1052–1060 each of which represents a corresponding ACL feature that may be applied at an outbound interface, such as security, encryption, WCCP, TCP Intercept and NAT, respectively. Another column 1062 represents the final or merged action to be implemented by the forwarding entity. Similarly, a plurality of rows 1070–1082 represent the possible combinations of conflicting actions from the ACL features of columns 1052–1060. Conflict resolution tables 1000 and 1050 are preferably preconfigured by the network administrator at the management station or by some other entity, and downloaded to and stored by device 316 preferably in NVRAM 408. Device 316 may copy tables 1000, 1050 to dynamic memory 409 upon initialization in a similar manner as described above in connection with the text-based ACLs.

When the ACL converter 424 identifies a conflict among the actions returned by two or more ACLs (e.g., security and encryption) being merged, it accesses the corresponding conflict resolution table 1000 or 1050 (depending on whether the unified ACL being built will be used for inbound or outbound purposes) and identifies the row that includes the identified conflict. The ACL converter 424 preferably starts from the top of the respective table 1000, 1050 and moves downwardly. The ACL converter 424 then adopts the final or merged action from column 1010 or 1062. After merging the retrieved BDD-formatted ACL with the function G (either at merge block 914 or 918), the boolean manipulation engine 428 determines whether another feature ACL has been assigned to interface 402a, as indicated at block 920. If so, the boolean manipulation engine 428 increments the counter M by 1, as indicated at block 922 and returns to block 908. Boolean manipulation engine 428 again retrieves the Mth BDD-formatted ACL for interface 402a (e.g., ACL 416c which is associated with encryption), as indicated at block 908, and merges it with the boolean function G, as indicated described above. This loop is repeated until all of the ACLs assigned to the given interface (e.g., interface 402a) have been merged into function G. At this point, there are no additional ACLs to be merged, and the response to decision block 920 is no.

It should be understood that tables 1000, 1050 may take other forms.

It should be further understood that ACL converter 424 may utilize other conflict resolution techniques besides tables 1000, 1050. FIG. 11, for example, illustrates a priority table 1100 that may be utilized by ACL converter 424 to resolve potential conflicts. Priority table 1100 includes a plurality of columns, including a feature column 1102, an ACL action column 1104, an executed action column 1106 (identifying the action actually implemented by the forwarding entity) and a priority column 1108. The priority table 1100 further includes a plurality of rows 1110–1120. Each row, moreover, corresponds to a particular ACL feature and one of its corresponding actions, which is assigned a priority. For example, a permit action from a security ACL (i.e., row 1110) has a priority of "1", while a permit action from an encryption ACL (i.e., row 1118) has a priority of "2". A permit and log action from the security ACL (i.e., row 1114) has a priority of "4".

ACL converter 424 may alternatively utilize the priority table 1100 to resolve conflicts identified at decision block 916 (FIG. 9A). More specifically, for each conflict, the ACL converter 424 accesses the priority table 1100 and retrieves the two priorities that correspond to the actions of the two conflicting ACLs. The ACL converter 424 then adopts the action specified by the criteria having the highest priority during the merging process. For example, the priority for a deny action by the security ACL (row 1112) is "3" and the priority for a permit action by the encryption ACL (row 1118) is "2". Accordingly, the ACL converter 424 adopts the action for the security ACL and drops corresponding messages.

Mapping Merged ACLs to TCAM

At this point, the ACL converter 424 has generated a single, unified, BDD-formatted ACL that merges all of the ACLs assigned to a particular interface. The next step is to map this single, unified ACL into the selected storage device (e.g., TCAM 410 and memory 411) for subsequent access by the forwarding entity 404. Basically, the ACL converter 424 writes a cover (i.e., a two-level formula) for the function G, which, as described above, represents the single, unified BDD. Preferably, the cover is written in Sum-of-Products (SOP) format, since this format is most easily translated into a TCAM. That is, each product or implicant from a SOP function can implemented at a row of the TCAM 410. Although a disjoint SOP cover can be computed directly from the single, unified BDD, the result is often suboptimal, because the number of product terms (i.e., implicants) is not minimized. To reduce the number of product terms (and thereby reduce the number of rows needed in the TCAM), the ACL converter 424 preferably creates a Zero-Suppressed Binary Decision Diagram (ZDD) first, which can be more efficient at producing covers, and then computes a cover from the ZDD in SOP format.

ZDDs, which are also canonical, differ from BDDs in that, with ZDDs, a node is suppressed if its "then" child is the constant "0", whereas, for BDDs, a node is suppressed if its two children are identical.

In particular, the boolean transformation engine 426 first converts the single, unified, BDD-formatted ACL for interface 402a into ZDD format, as indicated at block 922 (FIG. 9B). For example, engine 426 first creates two variables or nodes, for each variable or node in the BDD version of the function, for use in creating the ZDD version. One ZDD variable is the positive literal of the respective BDD variable and the other ZDD variable is the negative literal of the BDD variable. A literal is a constant or a variable or a complement of a constant or a variable of a boolean function. Using the ZDD variables, engine 426 then converts the BDD version of the function G into a ZDD version by computing an irredundant SOP (ISOP). This may be accomplished, for example, by applying the Monreale Theorem or by utilizing well-known Karnaugh maps. Computation of the ISOP preferably takes as its parameters two BDDs that express a function interval, which is an incompletely specified function, so as to obtain a more efficient coverage for use with TCAM 410. The function intervals may be produced by the merging process of steps 914 or 918.

For example, suppose that the ACL converter 424 has computed a given function G and that M now equals 3 so that the ACL converter 424 retrieves the third ACL. If there is no intersection between the function G and the third ACL, the response from decision block 912 is no, and the ACL converter 424 proceeds to perform the merge of block 914. The merge may simply consist of appending the third ACL at the bottom of the function G to create a new function G. It should be understood, however, that for those points or minterms where the result of function G is "1", the corresponding result from the third ACL is irrelevant. A minterm is a product term of literals in which every input is either complemented or un-complemented.

In other words, since the end result is to implement the action specified by function G, when its result or decision is "1", the corresponding result specified by the third ACL for the interval comprising this set of points or minterms does not matter. Accordingly, the ACL converter 424 can select any desired result for the third ACL for the minterms where the result of function G is "1". Preferably, the ACL converter 424 selects a result for the third ACL (e.g., "1" or "0") that is most convenient (e.g., the result providing the smallest representation) for processing the merge of steps 914 or 918.

With the single, unified, ACL now in ZDD format, engine 426 next computes the cover in SOP format, as indicated at block 926. For example, the ACL converter 424 may read the implicants of the ZDD by scanning those paths that connect its root to the decision block representing the constant "1". The ACL converter 424 then maps the SOP-formatted, unified ACL into the TCAM 410, as indicated at block 928. More specifically, the ACL converter maps the SOP-formatted, unified ACL to that portion (e.g., portion 410a) of the TCAM 410 that corresponds to the interface and direction being processed (e.g., interface 402a). Each row of the TCAM 410 preferably corresponds to a product term of the SOP-formatted, unified ACL. For each product term, the ACL converter 424 also stores the corresponding action in memory 411.

More specifically, each row of the TCAM 410 corresponds to an address, and, as described above, memory 411 includes a corresponding space or location for each address (i.e., row) of the TCAM 410. Thus, when the ACL converter 424 writes a particular product term into a row of the TCAM 410, it also writes the action that matches that product term, and is to be implemented by the forwarding entity 404 (e.g., permit, deny, forward to CPU 406, etc.) into the space or location of memory 411 that corresponds to the respective row of the TCAM 410. This process is then repeated for each of the remaining interfaces 402b–402e to which multiple ACLs have been assigned by the network administrator.

In the preferred embodiment, the software modules or libraries of ACL converter 424 incorporate a BDD software package known as CUDD which was developed by the Computer Science Department of the University of Colorado, Boulder and is available via anonymous FTP from vlsi.Colorado.EDU. CUDD basically provides elementary functions that manipulate BDDs and Zero-Suppressed BDDs. Other available BDD packages could also be utilized, such as the VIS Verification or SIS Synthesis packages developed at the University of California at Berkeley.

The optimizing, merging and storing of ACLs, as described above, preferably occurs as part of the boot-up procedure of device 316, or in response to new ACLs being downloaded or assigned by the network administrator.

It should be understood that other solutions for merging the multiple ACLs assigned to a given interface into a single, unified ACL may alternatively be employed. For example, for a given interface assigned 3 ACLs (e.g., ACL 202, ACL 303 and ACL 505), the ACL converter 424 may start with the ACL having the highest priority (e.g., ACL 303), rather than starting with the first ACL (e.g., ACL 202). The ACL converter 424 then builds corresponding BDD, ZDD and SOP functions for this single ACL and maps it into the respective portion of the TCAM 410, as described above. Next, the ACL converter 424 builds a BDD for the ACL having the second highest priority (e.g., ACL 505). As described above, the interval of ACL 505 for the set of points or minterms for which the result or decision of ACL 303 is the constant "1" is irrelevant (i.e., don't care), since ACL 303 has a higher priority than ACL 505. Accordingly, for this interval, the ACL converter 424 selects the most convenient result for building the respective ZDD. The ACL converter 424 then translates or computes the SOP coverage for ACL 505 and maps it into the TCAM 410 immediately following the entries for ACL 202. This process is then repeated for each ACL assigned to the given interface moving from highest priority ACL to lowest priority ACL.

It should also be understood that the ACL translation, optimization and merging function described above may be performed remotely from the intermediate network device. The single, unified, SOP-formatted ACLs may then be downloaded to the desired intermediate network device and mapped directly into a selected memory structure (e.g., the TCAM).

Evaluation of ACLs

In operation, a network message, such as IP message 100 (FIG. 1) is received at an interface (e.g., interface 402d) of intermediate device 316. Message 100 may have originated from the Internet 318 and be addressed to end station 312 in the engineering department. The message 100 is captured and provided to the forwarding entity 404. Forwarding entity 404 directs TCAM 410 to apply the single, unified ACL to the message 100. That is, forwarding entity 404 provides at least three inputs to the TCAM 410. First, the forwarding entity 404 identifies the port (e.g., physical port number) on which the message 100 was received. Second, it may assert or de-assert a bit to reflect the direction of the message at the respective port (i.e., input or output). Third, the forwarding entity 404 provides the contents of the fields of the message 100 that are to be tested. These fields may include the IP SA field 106, the IP DA field 108 and the Protocol field 104. Forwarding entity 404 may also recover the contents of the Source Port field 202 and the Destination Port field 204 from the corresponding TCP message 200 and also provide this information to the TCAM 410. The TCAM 410 is preferably on the order of 144 bits (or more wide). Accordingly, the TCAM 410 can evaluate IP SA (32 bits), IP DA (32 bits), Protocol (8 bits), Source Port (16 bits) and Destination Port (16 bits), and still have 10 bits available to specify the interface, direction (inbound or outbound) and other parameters. It should be understood that other configuration may also be desirable. For example, version 6 of the IP protocol specifies network addresses that are 128 bits in length.

Based on the first and second inputs, the TCAM 410 identifies the corresponding section containing the single, unified ACL for the subject interface. The information from the message fields being tested may then be placed in a Comparand register (not shown) by the TCAM 410. The TCAM 410 then proceeds to compare the contents of the Comparand register with the cells of each row of the identified section simultaneously (i.e., with the ACE statements of the single, unified ACL). When a matching row is detected, it's address is supplied to memory 411, thereby identifying a corresponding space or location therein. As described above, the corresponding space or location in memory 411 contains the action specified by the matching row of the TCAM 410, as loaded in memory 411 by the ACL converter 424. The specified action is then provided to the forwarding entity 404, which, in turn, implements it. For example, based on the IP SA of the message, the action may be drop. In response, forwarding entity 404 simply discards the message. As described above, other possible actions include switch to destination interface, apply QoS and switch to destination interface, forward to CPU 406 for addition processing, forward to second forwarding or processing entity, etc.

Once the forwarding entity 404 has implemented the appropriate action, it is ready to process the next message from interface 402d. As shown, there is no need for the forwarding entity 404 to evaluate multiple ACLs for each message. In addition, the evaluation of the single, unified ACL is performed by the TCAM at much higher speeds. Accordingly, forwarding entity 404 can process messages much more quickly than the prior art devices. In addition, ACL evaluation through the TCAM 410 preferably takes place in hardware rather than software. That is, forwarding entity 404 may include one or more Application Specific Integrated Circuits (ASICs) for extracting and supplying the relevant information to TCAM 410, unlike the prior art devices in which ACL evaluation is performed by one or more software modules or libraries. The present invention is thus able to achieve much higher switching speeds than the prior art devices. Indeed, the forwarding entity 404 of the present invention is effectively able to process network messages at rates of multi-Gigabits per second.

Off-Line ACL Optimization

Single, text-based ACLs often become long and unwieldy over time. In particular, as networks are changed and up-dated, network administrators often end up adding the same ACE statement to a given ACL multiple times. As a result, the given ACL may contain numerous redundant ACE statements consuming significant memory and processing resources. The present invention is also able to efficiently organize such ACLs.

Figure 12:
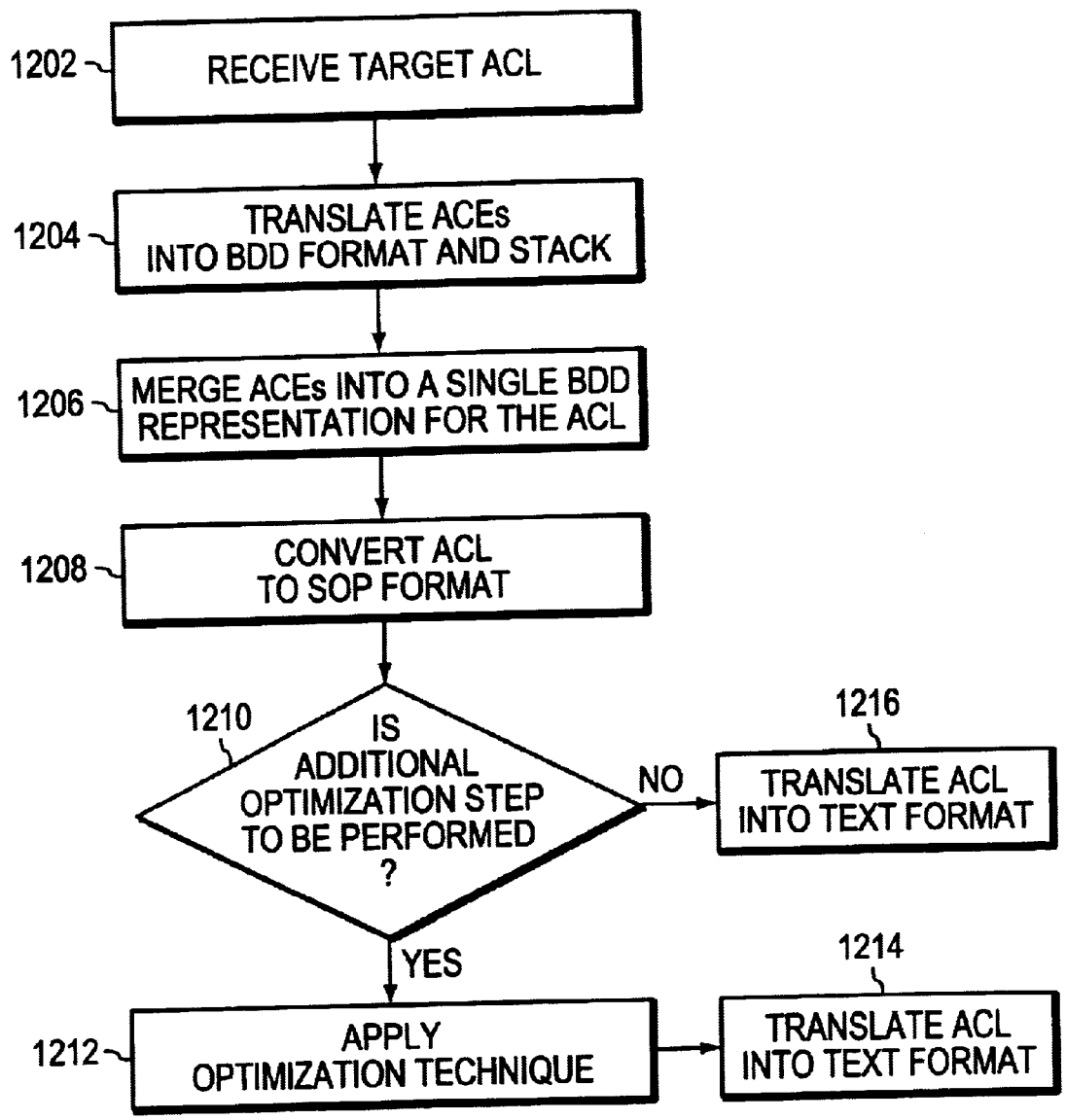

FIG. 12 is a block diagram of the steps for performing off-line ACL optimization. In particular, a target ACL represented in ASCII text format is downloaded by a network administrator to an end station for off-line ACL optimization, as indicated at block 1202. The end station includes an ACL converter having similar functionality as ACL converter 424, described above. Here, the ACL converter translates and stacks the ACEs of the ACL in BDD format in accordance with the steps described in connection with FIG. 6, as indicated at block 1204. Next, the ACL converter merges the ACEs of the ACL into a single BDD representation by following the steps described above in connection with FIG. 7, as indicated at block 1206. The ACL is then converted from BDD representation into SOP representation, as indicated at block 1208, and as described above in connection with FIGS. 9A–9B.

At this point, the ACL has been ordered and optimized. Depending on the nature and the particular features of the ACL, this may be sufficient optimization. Thus, the ACL converter preferably determines whether additional optimization is to be performed, as indicated at decision block 1210. For example, the ACL converter may query the network administrator or the network administrator may specify additional optimization at the start of the process. If additional optimization is to be performed, an optimization technique is applied, as indicated at block 1212. This additional optimization is preferably performed using the Espresso boolean minimization program developed and available from the Computer Science Department of the University of California at Berkeley. The Espresso program basically takes as its input an un-optimized SOP function and produces, as its output, an optimized SOP function. Following the additional optimization step, the ACL converter preferably translates the optimized ACL from SOP to text-based ASCII format, as indicated at block 1214. Since the Espresso program is computational intensive to perform, it is preferably applied only to those ACLs that are relatively stable (e.g., they are not being routinely up-dated or changed) and critical to the network.

The Espresso program is also described in R. Brayton, G. Hachtel, C. McMullen, A. Sangiovanni, Vincentelli *Logic Minimization Algorithms for VLSI Synthesis* (Kluwer Academic Publishers 1984).

If the additional optimization step is not to be performed, the ACL converter preferably translates the ACL from BDD format to text-based ASCII format, as indicated at block 1216. The optimized, compact ACL may now be retrieved by (or returned to) the network administrator and downloaded to one or more intermediate devices.

As shown, the off-line ACL optimization aspect of the present invention is able to eliminate redundant ACE statements in existing ACLs. Once optimized, the text-based ACLs can be evaluated by network devices more efficiently, thereby conserving memory and processor resources.

Evaluation of ACLs in BDD Format

In an alternative embodiment of the invention, rather than converting the single, unified ACLs for each interface into SOP format and then mapping them to the TCAM, the ACLs may be left in BDD or ZDD format, stored at the dynamic memory 409 and evaluated, essentially through software, by the forwarding entity 404. More specifically, upon receiving a message on a given port, the forwarding entity 404 may access the single, unified ACL in BDD format that corresponds to the given port from dynamic memory 409. Forwarding entity, 404 also extracts the necessary information from the message (such as IP source and destination addresses, etc.) needed to traverse the nodes of ACL 800. Utilizing the extracted information, the forwarding entity 404 then traverses the ACL 800 to reach one of the specified actions 806, 808 located at the end of the ACL 800. Depending on the path that is traversed, the corresponding action may be different (e.g. permit or deny). Referring to FIG. 8, for example, the first node 802 (a01) of the BDD 800 tests the least significant (i.e., the thirty-first) bit of the IP DA of the particular message being evaluated. Suppose the least significant of the IP DA is "0" and that node a01 is "0", then the result from node a01 is true, and following the solid arc 812, the next node to be evaluated is node a12. This process is repeated down the ACL 800 until one of the decisions 806, 808 is reached. If the value of a variable is "don't care", then the node is not even present.

The evaluation of an ACL in BDD format essentially takes a constant time regardless of the number of ACEs that are present in the ACL. Accordingly, a software evaluation of ACLs in BDD format may be preferred for ACLs that have a large number of ACEs. For example, if an ACL has between 8 to 16 or more ACEs, it may be more efficient to evaluate the ACL in BDD format.

Other ACL Formats

Those skilled in the art will understand that the number of tests specified by an ACL in BDD format may be reduced by collapsing several nodes into one or more supernodes that use multi-valued variables. More specifically, assuming the ACL tests IP SA (32 bits), IP DA (32 bits), Protocol (8 bits), Destination Port (16 bits) and Source Port (16 bits), then the ACL will have 104 individual tests or levels. If a plurality of single-variable nodes are organized into a supernode having a plurality of variables (e.g., 8), the number of tests can be substantially reduced. The supernodes, moreover, may be represented in a table array that facilitates processing. Each cell of the table, for example, may consist of a pair (action, value), such that the action specifies either (1) "go to" the cell identified by the respective value or (2) "return" the result identified by the respective value. Processing starts at the first cell of the table with the first set of input variables. If the action specified by the first set of input variables is "go to", processing resumes at the identified go to cell with the next set of input variables. Processing continues until the first "return" action is reached.

It should be understood that other data structures that similarly facilitate software/processor evaluation of the BDD may also be utilized.

Figure 13:
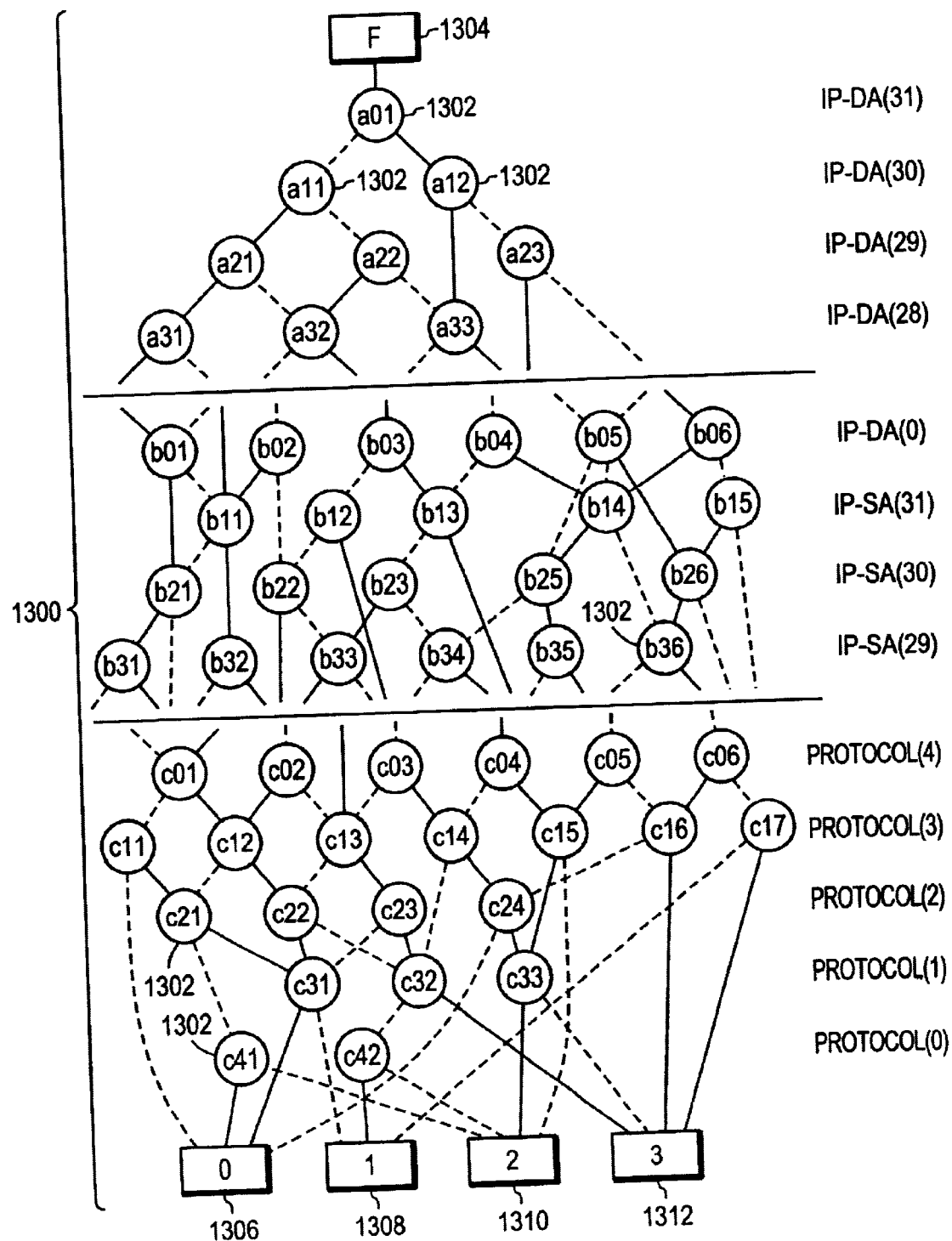
FIG. 13 is a schematic representation of an Algebraic Decision Diagram.

In addition to representing ACLs in BDD format, the ACL converter 424 may also represent ACLs as Algebraic Decision Diagrams (ADDs). FIG. 13 is a schematic illustration of an ACL 1300 in ADD format. ADD-formatted ACL 1300 includes a plurality of interconnected nodes 1302, each of which has its own identifying label (e.g., a01, a11, a12, a21, . . . c42). The nodes 1302 of the ADD-formatted ACL 1300 are also organized into levels with each level corresponding to a bit of a particular test criteria (e.g., IP-DA[31], IP-DA[30] and so on). ADD 1300 also includes a start block or root 1304. Unlike BDDs, an ADD may have more than two final results or decisions. ADD 1300, for example, has four decision blocks 1306–1312 (e.g., permit, deny, permit and log, and deny and log). Thus, a single ADD-formatted ACL may be used to represent an ACL having more than two different results. A suitable description of ADD manipulation is described in R. Bahar, E. Frohm, C. Gaona, G. Hachtel, E. Macii, A. Pardo, F. Somenzi *Algebraic Decision Diagrams and their Applications* International Conference on Computer Aided Design, November 1993, which is hereby incorporated by reference in its entirety.

The foregoing description has been directed to specific embodiments of the invention. It will be apparent, however, that other variations and modifications may be made to the described embodiments, with the attainment of some or all of their advantages. For example, rather than include a separate memory 411 associated with the TCAM 410, the ACL converter may write the corresponding actions into dynamic memory 409. Upon locating a match, the TCAM 410 may then return the matching address to the forwarding entity 404, which may access dynamic memory 409 in order to retrieve the corresponding action. Those skilled in the art will recognize that other arrangements are also possible. Therefore, it is the object of the appended claims to cover all such variations and modifications as come within the true spirit and scope of the invention.

What is claimed is:

1. In an intermediate network device having a plurality of ports for forwarding messages between one or more network entities across a computer network and a memory device, a method for optimizing one or more Access Control Lists (ACLs) comprising the steps of:

retrieving a first ACL having a plurality of Access Control Entry (ACE) statements;

translating each ACE statement of the first ACL into a Binary Decision Diagram (BDD) format;

processing each of the BDD-formatted ACE statements so as to generate a single BDD corresponding to the first ACL; and translating the single BDD-formatted ACL into a second boolean representation and storing the ACL corresponding to the second boolean representation at the memory device for subsequent evaluation by the intermediate device.

2. The method of claim 1 wherein the step of processing comprises:

extracting a selected BDD-formatted ACE statement from the ACL; and applying an If-Then-Else (ITE) operator to the extracted ACE statement and a function representing the first ACL.

3. The method of claim 2 wherein the function representing the first ACL is optimized with dynamic re-ordering.

4. The method of claim 3 wherein the memory device is a content addressable memory (CAM).

5. The method of claim 4 wherein the second boolean representation is a Sum of Products (SOP) representation.

6. The method of claim 5 wherein a plurality of ACLs are assigned to a given interface of the intermediate device and the intermediate device includes at least one conflict resolution table for resolving conflicts among actions specified by the plurality of ACLs, the method further comprises the step of merging each ACL assigned to the given interface, utilizing the least one conflict resolution table, into a single, unified ACL that represents all of the ACLs assigned to the given interface.

7. The method of claim 6 further comprising step of storing the single, unified ACL at a portion of the CAM that corresponds to the given interface.

8. The method of claim 7 wherein the ACLs are used to evaluate network messages received by the intermediate network device, and the ACEs specify one or more of Internet Protocol (IP) source address, IP destination address, Transmission Control Protocol/User Datagram Protocol (TCP/UDP) source port and TCP/UDP destination port.

9. The method of claim 1 wherein the second boolean representation is a Sum of Products (SOP) representation.

10. The method of claim 1 wherein a plurality of ACLs are assigned to a given interface of the intermediate device and the intermediate device includes at least one conflict resolution table for resolving conflicts among actions specified by the plurality of ACLs, the method further comprises the step of merging each ACL assigned to the given interface, utilizing the at least one conflict resolution table, into a single, unified ACL that resents all of the ACLs assigned to the given interface.

11. The method of claim 1 wherein the ACLs are used to search against network messages, and the ACEs specify one or more of Internet Protocol (IP) source address, IP destination address, Transmission Control Protocol/User Datagram Protocol (TCP/UDP) source port and TCP/UDP destination port.

12. An Access Control List (ACL) converter for use at an intermediate network device having a plurality of interfaces for forwarding messages between one or more network entities across a computer network and a memory device storing one or more ACLs in a first format, each of the one or more ACLs having a plurality of Access Control Entry (ACE) statements, wherein a plurality of ACLs are assigned to a given interface, the ACL converter comprising:

a boolean transformation engine configured to retrieve the one or more ACL in the first format, and to translate the ACE statements of the one or more ACL into a Binary Decision Diagram (BDD) format; and a boolean manipulation engine cooperatively coupled to the boolean transformation engine and configured to process each of the BDD-formatted ACE statements so as to generate a single BDD corresponding to the first ACL, wherein the boolean manipulation engine is further configured to merge each ACL assigned to the given interface into a single, unified ACL that represents all of the ACLs assigned to the given interface.

13. The intermediate network device of claim 12 further comprising at least one conflict resolution table for resolving conflicts among actions specified by the plurality of ACLs assigned to the given interface, wherein the boolean manipulation engine is further configured to utilize the least one conflict resolution table when merging each ACL assigned to the given interface, into the single, unified ACL.

14. The intermediate network device of claim 13 wherein the memory device is a content address memory (CAM) having a plurality of portions each of which is associated with an interface of the network device, wherein the boolean translation engine is further configured to convert the single, unified ACL for the given interface into a second boolean representation and to store the single, unified ACL in the second boolean representation format at the portion of the CAM that is associated with the given interface.

15. A computer readable medium containing executable program instructions for optimizing one or more Access Control Lists (ACLs) comprising the steps of:

retrieving a first ACL having a plurality of Access Control Entry (ACE) statements;

translating each ACE statement of the first ACL into a Binary Decision Diagram (BDD) format;

processing each of the BDD-formatted ACE statements so as to generate a single BDD corresponding to the first ACL; and translating the single BDD-formatted ACL into a second boolean representation; and storing the ACL corresponding to the second boolean representation at the memory device for subsequent evaluation by the intermediate device.

16. The computer readable medium of claim 15 comprising further program instructions for:

extracting a selected BDD-formatted ACE statement from the ACL; and applying an If-Then-Else (ITE) operator to the extracted ACE statement and a function representing the first ACL.

17. The computer readable medium of claim 16 wherein the function representing the first ACL is optimized with dynamic re-ordering.

18. The computer readable medium of claim 15 wherein the second boolean representation is a Sum of Products (SOP) representation.

19. The computer readable medium of claim 15 wherein the ACLs are used to evaluate network messages received by the intermediate network device, and the ACEs specify one or more of Internet Protocol (IP) source address, IP destination address, Transmission Control Protocol/User Datagram Protocol (TCP/UDP) source port and TCP/UDP destination port.

* * * * *